(12) United States Patent
Song et al.

(10) Patent No.: US 12,228,768 B2
(45) Date of Patent: Feb. 18, 2025

(54) FABRICATION PROCESS CONTROL IN OPTICAL DEVICES

(71) Applicant: Taiwan Semiconductor Manufacturing Co., Ltd., Hsinchu (TW)

(72) Inventors: Weiwei Song, San Jose, CA (US); Chan-Hong Chern, Palo Alto, CA (US); Chih-Chang Lin, San Jose, CA (US); Stefan Rusu, Sunnyvale, CA (US); Min-Hsiang Hsu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/063,186

(22) Filed: Dec. 8, 2022

(65) Prior Publication Data

US 2023/0105446 A1 Apr. 6, 2023

Related U.S. Application Data

(63) Continuation of application No. 17/150,628, filed on Jan. 15, 2021, now Pat. No. 11,525,957.

(Continued)

(51) Int. Cl.
*G02B 6/124* (2006.01)
*B29D 11/00* (2006.01)
(Continued)

(52) U.S. Cl.
CPC ........ *G02B 6/124* (2013.01); *B29D 11/00663* (2013.01); *G02B 6/1228* (2013.01);
(Continued)

(58) Field of Classification Search
None
See application file for complete search history.

(56) References Cited

U.S. PATENT DOCUMENTS 5,342,478 A * 8/1994 Welbourn .............. G02B 6/136
438/31
6,792,189 B2 * 9/2004 Sasaura ................. G02F 1/035
117/948

(Continued)

FOREIGN PATENT DOCUMENTS

CN 101915965 A 12/2010
CN 102692682 A 9/2012
(Continued)

*Primary Examiner* — Rhonda S Peace
(74) *Attorney, Agent, or Firm* — Sterne, Kessler, Goldstein & Fox P.L.L.C.

(57) ABSTRACT

Methods of fabricating optical devices with high refractive index materials are disclosed. The method includes forming a first oxide layer on a substrate and forming a patterned template layer with first and second trenches on the first oxide layer. A material of the patterned template layer has a first refractive index. The method further includes forming a first portion of a waveguide and a first portion of an optical coupler within the first and second trenches, respectively, forming a second portion of the waveguide and a second portion of the optical coupler on a top surface of the patterned template layer, and depositing a cladding layer on the second portions of the waveguide and optical coupler. The waveguide and the optical coupler include materials with a second refractive index that is greater than the first refractive index.

20 Claims, 46 Drawing Sheets

Related U.S. Application Data

(60) Provisional application No. 63/002,499, filed on Mar. 31, 2020.

(51) Int. Cl.
   *G02B 6/122* (2006.01)
   *G02B 6/132* (2006.01)
   *G02B 6/12* (2006.01)

(52) U.S. Cl.
   CPC .... *G02B 6/132* (2013.01); *G02B 2006/12097* (2013.01); *G02B 2006/12107* (2013.01); *G02B 2006/12197* (2013.01)

(56) References Cited

U.S. PATENT DOCUMENTS

| | | | |
|---|---|---|---|
| 7,881,574 B2 * | 2/2011 | Pyo | G02B 6/34 |
| | | | 385/44 |
| 8,791,405 B2 | 7/2014 | Ji et al. | |
| 8,873,901 B2 | 10/2014 | Kang et al. | |
| 9,176,291 B2 | 11/2015 | Li et al. | |
| 9,274,283 B1 | 3/2016 | Ellis-Monaghan et al. | |
| 9,482,816 B2 | 11/2016 | Van Campenhout et al. | |
| 9,671,557 B1 | 6/2017 | Ding et al. | |
| 9,799,791 B2 | 10/2017 | Collins | |
| 9,864,138 B2 * | 1/2018 | Coolbaugh | H01L 31/02327 |
| 9,885,831 B2 * | 2/2018 | Ding | G02B 6/125 |
| 10,302,870 B2 | 5/2019 | Hassan et al. | |
| 10,468,849 B1 * | 11/2019 | Bradley | H01S 3/163 |
| 11,525,957 B2 * | 12/2022 | Song | G02B 6/124 |
| 11,650,382 B1 * | 5/2023 | Sporer | G02B 6/4251 |
| | | | 385/92 |
| 11,709,315 B2 * | 7/2023 | Boeuf | G02B 6/126 |
| | | | 385/11 |
| 2003/0033975 A1 * | 2/2003 | Bazylenko | G02B 6/122 |
| | | | 117/84 |
| 2003/0110808 A1 * | 6/2003 | M'Saad | C03C 17/02 |
| | | | 65/391 |
| 2011/0150386 A1 | 6/2011 | Dupuis et al. | |
| 2012/0045172 A1 | 2/2012 | Feng et al. | |
| 2012/0250007 A1 | 10/2012 | Na et al. | |
| 2012/0314991 A1 | 12/2012 | Kang et al. | |
| 2012/0314993 A1 | 12/2012 | Kang et al. | |
| 2014/0264723 A1 | 9/2014 | Liang et al. | |
| 2014/0314374 A1 | 10/2014 | Fattal et al. | |
| 2016/0197111 A1 * | 7/2016 | Coolbaugh | H01L 31/0232 |
| | | | 438/69 |
| 2018/0052338 A1 | 2/2018 | Kunishima et al. | |
| 2020/0341200 A1 | 10/2020 | Van Vaerenbergh et al. | |
| 2021/0302650 A1 | 9/2021 | Song et al. | |
| 2022/0397721 A1 * | 12/2022 | Thomson | G02B 6/122 |
| 2023/0105446 A1 * | 4/2023 | Song | G02B 6/1228 |
| | | | 385/37 |

FOREIGN PATENT DOCUMENTS

| | | |
|---|---|---|
| CN | 103688428 A | 3/2014 |
| EP | 3296783 A1 | 3/2018 |
| TW | 201319646 A | 5/2013 |
| TW | 201324704 A | 6/2013 |
| TW | 201740148 A | 11/2017 |

* cited by examiner

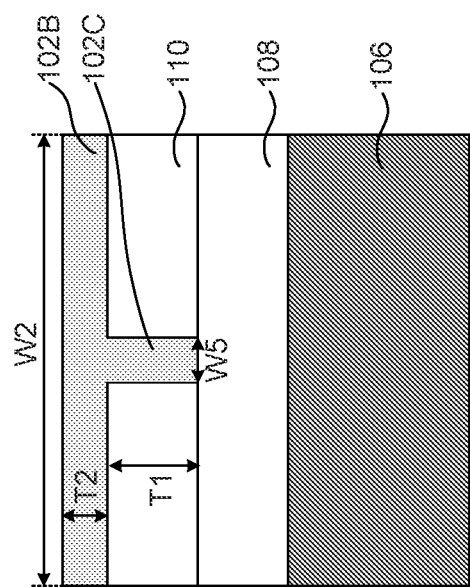
Fig. 1D
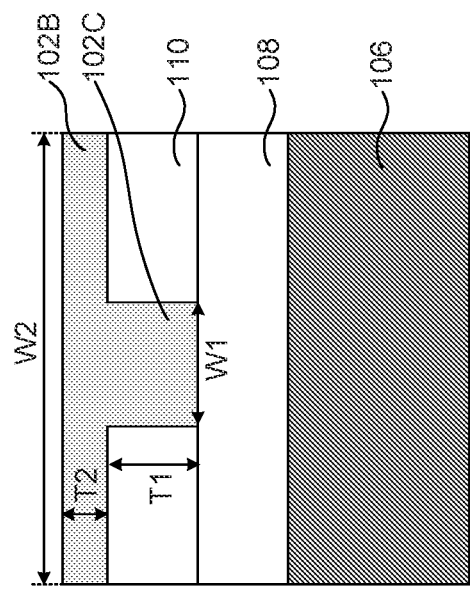
Fig. 1C
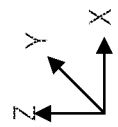

FABRICATION PROCESS CONTROL IN OPTICAL DEVICES

CROSS-REFERENCE TO RELATED APPLICATIONS

This application is a continuation of U.S. patent application Ser. No. 17/150,628, titled "Fabrication Process Control in Optical Devices," filed Jan. 15, 2021, which claims the benefit of U.S. Provisional Patent Application No. 63/002,499, titled "Methods for Patterning Dielectric Structures of Photonic Integrated Circuits," filed Mar. 31, 2020, each of which is incorporated by reference herein in its entirety.

BACKGROUND

One of the approaches to coupling optical fibers to waveguides on silicon (Si) photonic integrated circuits (PIC) is to optically couple the optical fibers and Si-PIC with optical coupling devices, such as grating couplers. Optical coupling devices reduce the optical mode size mismatch between the optical fibers and the waveguides for light to transfer between the optical fibers and Si-PICs. However, the scaling down of Si-PIC dimensions to meet the increasing demand for faster processing systems has increased the complexity of manufacturing waveguides and optical coupling devices with high optical efficiency.

BRIEF DESCRIPTION OF THE DRAWINGS

Aspects of this disclosure are best understood from the following detailed description when read with the accompanying figures.

FIGS. 1B-1D illustrate an isometric view and cross-sectional views of an edge coupler and a waveguide, in accordance with some embodiments.

Figure 1A:
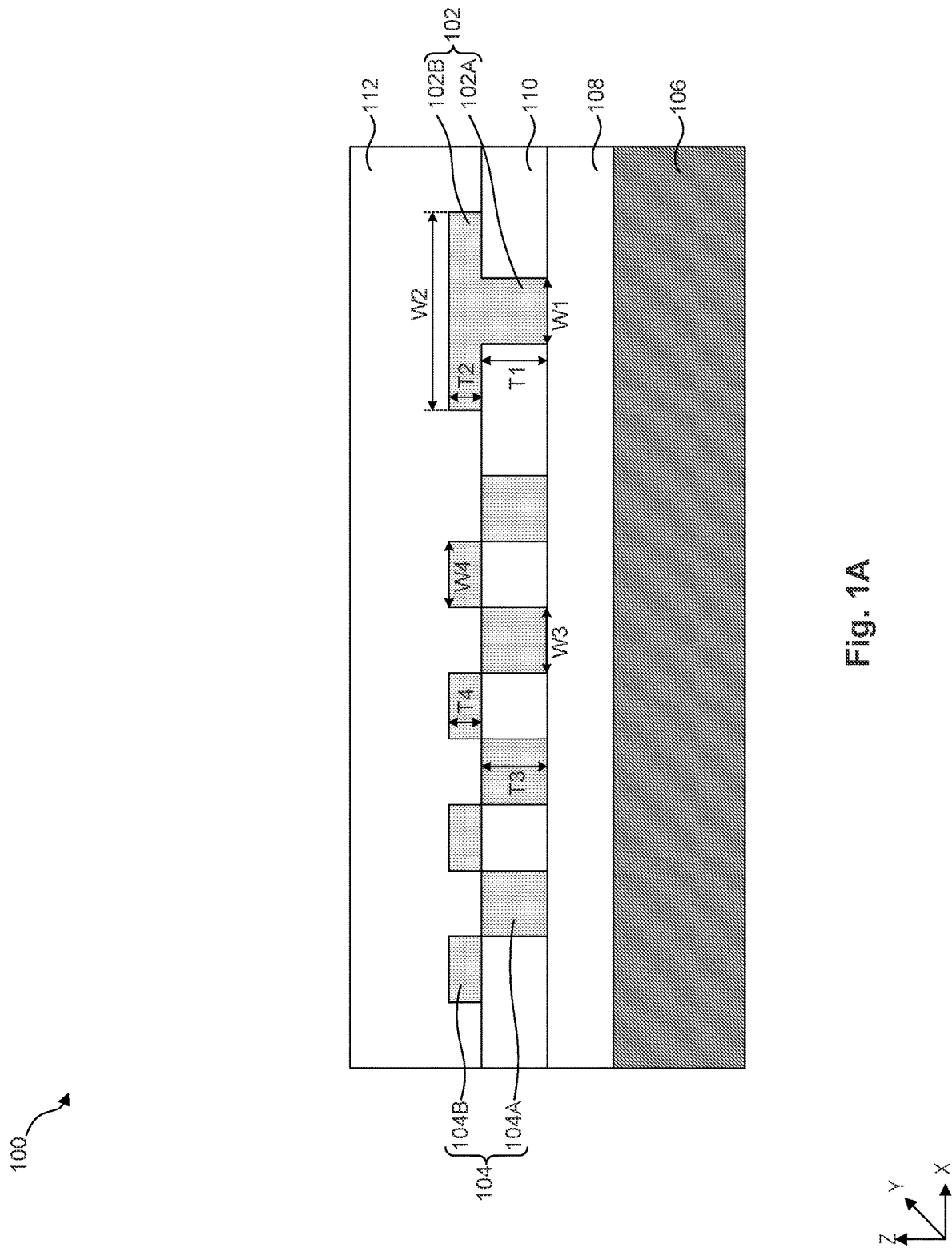
FIG. 1A illustrates a cross-sectional view of an optical device with a waveguide and an optical coupling device, in accordance with some embodiments.

Illustrative embodiments will now be described with reference to the accompanying drawings. In the drawings, like reference numerals generally indicate identical, functionally similar, and/or structurally similar elements. The discussion of elements in FIGS. 1A-1D and 2-45 with the same annotations applies to each other, unless mentioned otherwise.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the process for forming a first feature over a second feature in the description that follows may include embodiments in which the first and second features are formed in direct contact, and may also include embodiments in which additional features may be formed between the first and second features, such that the first and second features may not be in direct contact. As used herein, the formation of a first feature on a second feature means the first feature is formed in direct contact with the second feature. In addition, the present disclosure may repeat reference numerals and/or letters in the various examples. This repetition does not in itself dictate a relationship between the various embodiments and/or configurations discussed.

Spatially relative terms, such as "beneath," "below," "lower," "above," "upper," and the like may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

It is noted that references in the specification to "one embodiment," "an embodiment," "an example embodiment," "exemplary," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

It is to be understood that the phraseology or terminology herein is for the purpose of description and not of limitation, such that the terminology or phraseology of the present specification is to be interpreted by those skilled in relevant art(s) in light of the teachings herein.

As used herein, the term "high refractive index" refers to a refractive index that is equal to or greater than 2.0.

As used herein, the term "low refractive index" refers to a refractive index that is equal to or less than 2.0.

In some embodiments, the terms "about" and "substantially" can indicate a value of a given quantity that varies within 5% of the value (e.g., ±1%, ±2%, ±3%, ±4%, ±5% of the value). These values are merely examples and are not intended to be limiting. The terms "about" and "substantially" can refer to a percentage of the values as interpreted by those skilled in relevant art(s) in light of the teachings herein.

Optical fibers can have a relatively large core in comparison to waveguides on Si-PICs, resulting in a larger optical mode field than the mode associated with the waveguides on the Si-PICs. Direct optical coupling between the optical fibers and the waveguides can result in high optical coupling losses and high optical signal losses due to the optical mode size mismatch and the refractive index mismatch between the optical fibers and the waveguides. To reduce such mismatches, optical coupling devices (also referred to as "couplers") are used to optically couple the optical fibers to the waveguides on the Si-PICs. The couplers serve as optical mode size converters to improve optical coupling efficiency between the optical fibers and the waveguides.

The waveguides and couplers can include semiconductor and/or dielectric materials with a high refractive index disposed within dielectric materials with a low refractive index. The high refractive index materials can include Si, silicon nitride (SiN), aluminum oxide ($Al_2O_3$), hafnium oxide ($HfO_2$), or other suitable high refractive index materials within the scope of the present disclosure. The low refractive index materials can include silicon oxide ($SiO_2$) or other suitable low refractive index materials within the scope of the present disclosure.

One of the challenges of fabricating the waveguides and couplers is the patterning of the high refractive index materials to achieve minimal edge roughness (e.g., roughness less than 1 nm) and/or line width variation (e.g., variation less than 1 nm) in the patterned features of the waveguides and couplers. For example, fabricating SiN based waveguides and/or couplers with thick SiN layers (e.g., thickness of about 200 nm or greater or thickness between about 300 nm to about 1000 nm) to achieve the optimal device performance is challenging because depositing a high quality thick SiN layer leads to bowing of the substrate along with the SiN layer, which makes the patterning of the deposited SiN layer challenging. Deposition of the thick SiN layers can also lead to cracks in the substrate of the SiN based waveguides and/or couplers due to accumulated stress in the SiN layers. Further, patterning the thick SiN layers requires complex processing steps, such as multiple coating, patterning, etching, and/or polishing processes, which makes it difficult to accurately control the line width, side wall slope, and/or edge roughness of the patterned SiN features. The difficulty in process control also makes it difficult to pattern the SiN based waveguides and/or couplers with small features, such as sharp tapered features and small gaps in the waveguides and/or couplers.

The performance of the waveguides and couplers depends on the patterning process control. For example, the optical loss and/or power consumption in the waveguides can be high if the edge roughness and/or line width uniformity of the patterned features of the waveguides are poorly controlled during the fabrication process. Thus, the challenges of patterning the high refractive index materials used for the waveguides and couplers limits the minimum optical mode size mismatch and the maximum optical coupling efficiency that can be achieved between the optical fibers and the waveguides and couplers.

The present disclosure provides examples methods of fabricating waveguides and couplers with improved process control in patterning high refractive index materials. In some embodiments, the example methods use a patterned layer of a relatively lower refractive index material (e.g., $SiO_2$) as a template to pattern thick layers of the high refractive index materials. The low refractive index material used for the patterned template layer has a less complex patterning process and a better critical dimension control of the patterned features than the high refractive index materials. The use of the patterned template layer with the low refractive index materials eliminates the complex deposition, etching, and polishing processes required for patterning thick layers of high refractive index materials. As a result, the use of the patterned template layer mitigates the stress related damages to the substrate of the waveguides and couplers and reduces the complexities of fabricating waveguides and couplers with thick layers of the high refractive index materials.

Further, the use of the patterned template layer provides better control over the edge roughness, surface roughness, and/or line width uniformity of the features patterned with the high refractive index materials. The smoother surfaces lead to low optical losses in the waveguides and couplers. In some embodiments, the example methods can reduce the surface roughness to about 1 nm or less, which leads to propagation loss in Si-based waveguides to be about 1 dB/cm or less and in SiN-based waveguides to about 0.2 dB/cm or less.

FIG. 1A illustrates a cross-sectional view of an optical device 100 with a waveguide 102 and an optical coupling device 104 (also referred to as a "grating coupler 104"), according to some embodiments.

Optical device 100 can include a substrate 106, a thermal oxide layer 108 disposed on substrate 106, a patterned template layer 110 disposed on thermal oxide layer 108, and a cladding layer 112 disposed on patterned template layer 110. Substrate 106 can be a semiconductor material, such as silicon, germanium (Ge), silicon germanium (SiGe), a silicon-on-insulator (SOI) structure, other suitable semiconductor materials, and a combination thereof. Thermal oxide layer 108 can include a thermally grown $SiO_2$, a thermally grown oxide of the material of substrate 106, or other suitable thermally grown oxide materials with a low refractive index. Patterned template layer 110 can include a chemically deposited $SiO_2$ or other suitable chemically deposited oxide materials with a low refractive index. The chemically deposited $SiO_2$ or other oxide materials can be deposited by a chemical vapor deposition (CVD) process, a low pressure CVD (LPCVD) process, or a plasma enhanced CVD (PECVD) process and can be referred to as "CVD oxide materials" or "non-thermal oxide materials." The CVD oxide materials are included in patterned template layer 110 instead of thermally grown oxide materials because CVD oxide materials are easier and faster to etch during the fabrication of patterned template layer 110 than the thermally grown oxide materials. Cladding layer 112 can include a material similar to the material of patterned template layer 110 or other suitable dielectric materials with a low refractive index.

Waveguide 102 and grating coupler 104 can be disposed on thermal oxide layer 108. In some embodiments, waveguide 102 can include a rib portion 102A disposed within patterned template layer 110 and a slab portion 102B disposed on rib portion 102A and within cladding layer 112. Both rib portion 102A and slab portion 102B can include a semiconductor or a dielectric material with a high refractive index, such as Si, SiN, $Al_2O_3$, $HfO_2$, and other suitable materials with a high refractive index. Rib portion 102A can have a thickness T1 along a Z-axis and a width W1 along an X-axis, and slab portion 102B can have a thickness T2 along a Z-axis and a width W2 along an X-axis. Width W2 is greater than width W1. A ratio of W2:W1 can range from about 1:1 to about 100:1 for optimal performance of waveguide 102 (e.g., for negligible propagation loss). In some embodiments, thickness T1 can range from about 200 nm to about 2000 nm or can be other suitable dimensions and thickness T2 can range from about 1 nm to about 1000 nm or can be other suitable dimensions.

Figure 1B:
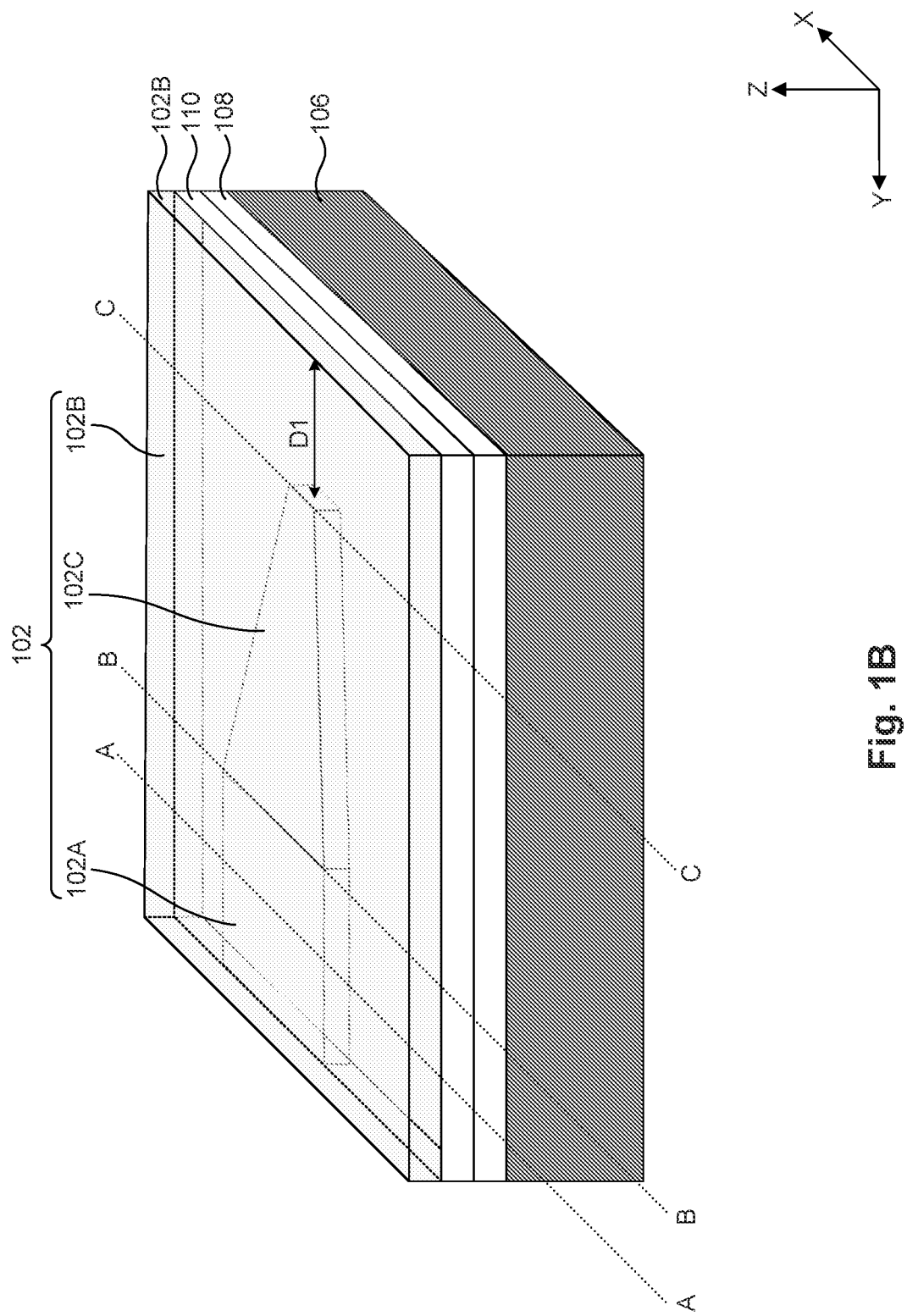

In some embodiments, waveguide 102 can have an isometric view as shown in FIG. 1B. The cross-sectional view of waveguide 102 in FIG. 1A can be along line A-A of FIG. 1B. FIG. 1B illustrates waveguide 102 disposed on thermal oxide layer 108, which is disposed on substrate 106. FIG. 1B further illustrates rib portion 102A disposed within patterned template layer 110 and slab portion 102B disposed on rib portion 102A. Cladding layer 112 on slab portion 102B is not shown in FIG. 1B for simplicity. In some embodiments, waveguide 102 can further include a tapered portion 102C in physical contact with rib portion 102A and disposed within patterned template layer 110 and under slab portion 102B, as shown in FIG. 1B. Tapered portion 102C can be a material similar to rib portion 102A. The base of tapered portion 102C can be in physical contact with a side of rib portion 102A, as shown in FIG. 1B, and the width and thickness of the base of tapered portion 102C can be equal to width W1 and thickness T1 of rib portion 102A, as shown in FIG. 1C. FIG. 1C illustrates a cross-sectional view along line B-B (i.e., along the base of tapered portion 102C) of FIG. 1B. The tip of tapered portion 102C can be spaced apart from the edge of slab portion 102B by a distance D1, as shown in FIG. 1B. In some embodiments, distance D1 can range from about 1 nm to about 10 µm for optimal performance of waveguide 102 with tapered portion 102C. The tip of tapered portion 102C can have a thickness T1 and a width W5, as shown in FIG. 1D. FIG. 1D illustrates a cross-sectional view along line C-C (i.e., along the tip of tapered portion 102C) of FIG. 1B. In some embodiments, a ratio of W1:W5 can range from about 1:1 to about 10:1 for optimal performance of waveguide 102 with tapered portion 102C.

Referring back to FIG. 1A, grating coupler 104 can be configured to optically couple waveguide 102 to an optical fiber (not shown) in a Si-PIC. In some embodiments, grating coupler 104 can be a dual layered grating coupler with an array of bottom grating lines 104A disposed with patterned template layer 110 and an array of top grating lines 104B disposed within cladding layer 112. Patterned template layer 110 can electrically isolate bottom grating lines 104A from each other and cladding layer 112 can electrically isolate top grating lines 104A from each other. In some embodiments, the array of top grating lines 104B can be non-overlapping with the array of bottom grating lines, as shown in FIG. 1A. In some embodiments, one or more of top grating lines 104B can partially or fully overlap one or more of bottom grating lines (not shown). The arrays of bottom and top grating lines 104A-104B can include a semiconductor or a dielectric material with a high refractive index, such as Si, SiN, $Al_2O_3$, $HfO_2$, and other suitable materials with a high refractive index. In some embodiments, the arrays of bottom and top grating lines 104A-104B can have a material similar to or different from each other.

Each of bottom grating lines 104A can have a thickness T3 along a Z-axis and a width W3 along an X-axis, and each of top grating lines 104B can have a thickness T4 along a Z-axis and a width W4 along an X-axis. Thickness T3 can be greater than thickness T4, and widths W3-W4 can be equal to or different from each other. A ratio of T3:T4 can range from about 1:4 to about 4:1 for optimal performance of grating coupler 104. In some embodiments, thickness T3 can range from about 50 nm to about 1000 nm or can be other suitable dimensions and thickness T4 can range from about 1 nm to about 1000 nm or can be other suitable dimensions. In some embodiments, thickness T3-T4 can be substantially equal to thickness T1-T2, respectively.

Figure 2:
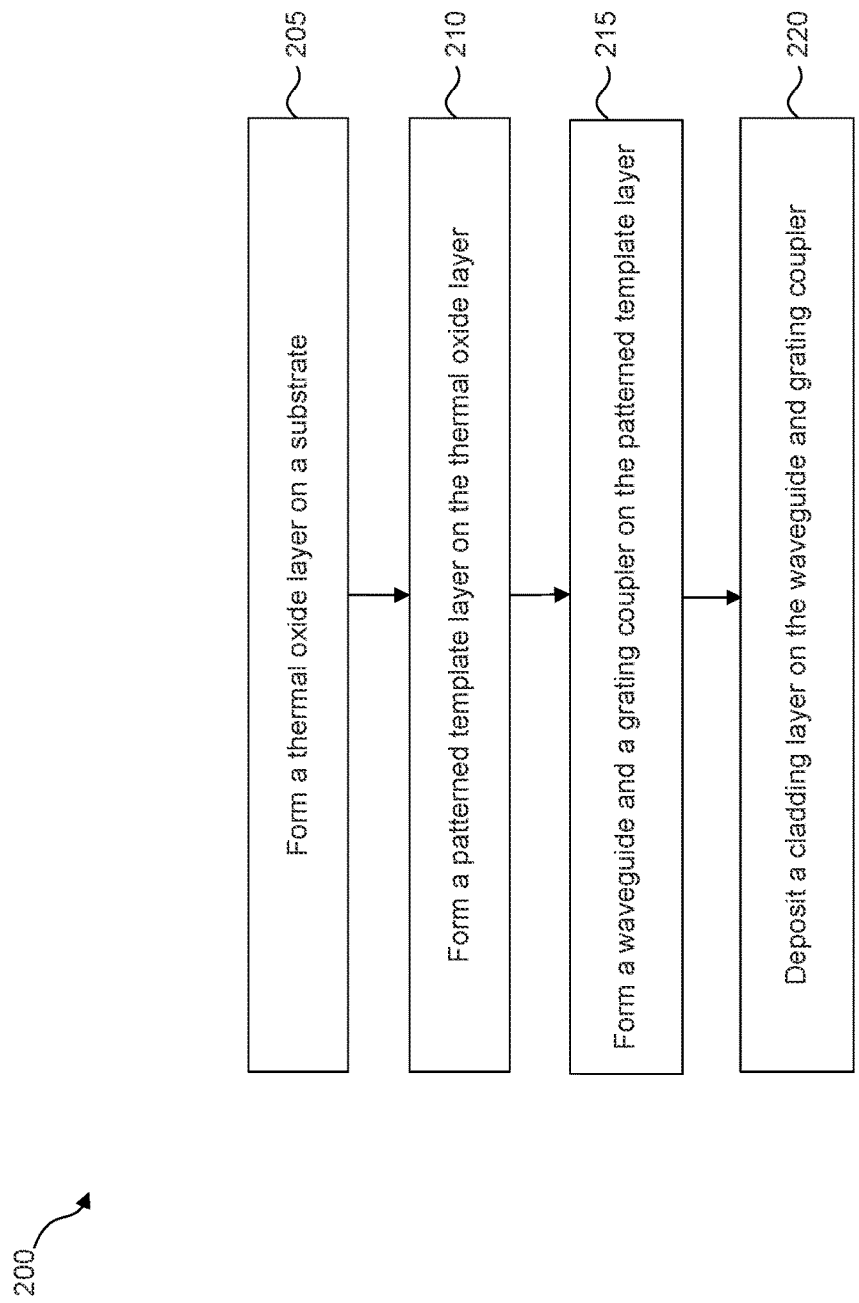
FIG. 2 is a flow diagram of a method for fabricating an optical device with a waveguide and an optical coupling device, in accordance with some embodiments.

FIG. 2 is a flow diagram of an example method 200 for fabricating optical device 100 with waveguide 102 and grating coupler 104, according to some embodiments. For illustrative purposes, the operations illustrated in FIG. 2 will be described with reference to the example fabrication process for forming optical device 100 with waveguide 102 and grating coupler 104 as illustrated in FIGS. 3-8. The operations can be performed in a different order or not performed depending on specific applications. Method 200 may not produce a complete optical device 100. Accordingly, additional processes can be provided before, during, and after method 200, and that some other processes may only be briefly described herein. Elements in FIGS. 3-8 with the same annotations as elements in FIGS. 1A-1D are described above.

Figure 3:
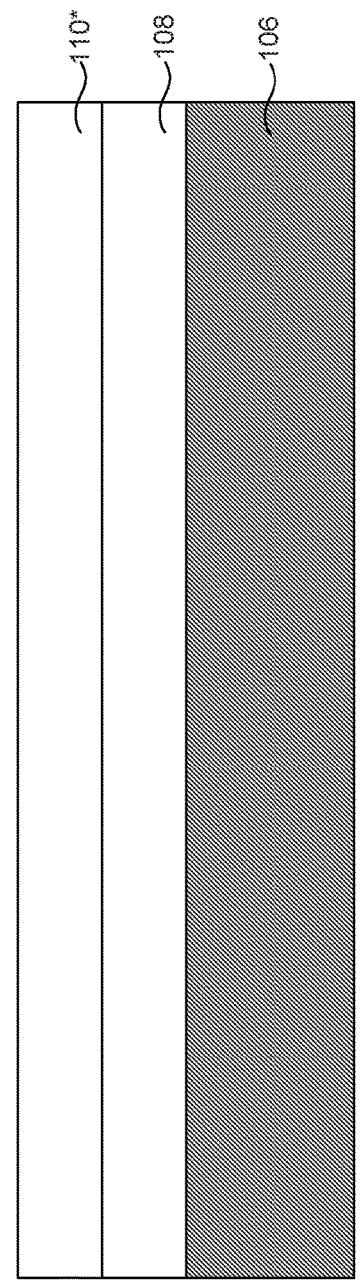
FIGS. 3-8 illustrate cross-sectional views of an optical device with a waveguide and an optical coupling device at various stages of its fabrication process, in accordance with some embodiments.

In operation 205, a thermal oxide layer is formed on a substrate. For example, as shown in FIG. 3, thermal oxide layer 108 is formed on substrate 106. In some embodiments, substrate can include Si and a thermal $SiO_2$ layer 108 can be formed on substrate 106. In some embodiments, the formation of thermal oxide layer 108 can include forming a thermal oxide layer with a thickness of about 10 nm to about 10 µm on substrate 106 by annealing substrate 106 at a temperature of about 600° C. to about 1100° C. in an oxygen ambient or in a steam and oxygen ambient. During the annealing process (also referred to as "thermal oxidation process"), a top portion of substrate 106 is oxidized to form thermal oxide layer 108.

In some embodiments, instead of forming thermal oxide layer 108 on substrate 106, an SOI substrate can be provided, followed by the removal of top Si layer of the SOI substrate to expose the buried oxide layer of the SOI substrate (not shown). The buried oxide layer can be thermal oxide layer 108.

Referring to FIG. 2, in operation 210, a patterned template layer is formed on the thermal oxide layer. For example, as described with FIGS. 3-4, patterned template layer 110 with trenches 414-416 are formed on thermal oxide layer 108. In subsequent processing, trench 414 defines the structure and dimensions of rib portion 102A of waveguide 102 and trenches 416 define the structure and dimensions of the array of bottom grating lines 104A of grating coupler 104. The dimensions of trench 414 can depend on the dimensions of rib portion 102A and the dimension of trenches 416 can depend on the dimensions of bottom grating lines 104A. Height H1 and width W6 of trench 414 can be substantially equal to thickness T1 and width W1, respectively, of rib portion 102A. Height H2 and width W7 of trenches 416 can be substantially equal to thickness T3 and width W3, respectively, of bottom grating lines 104A.

Figure 4:
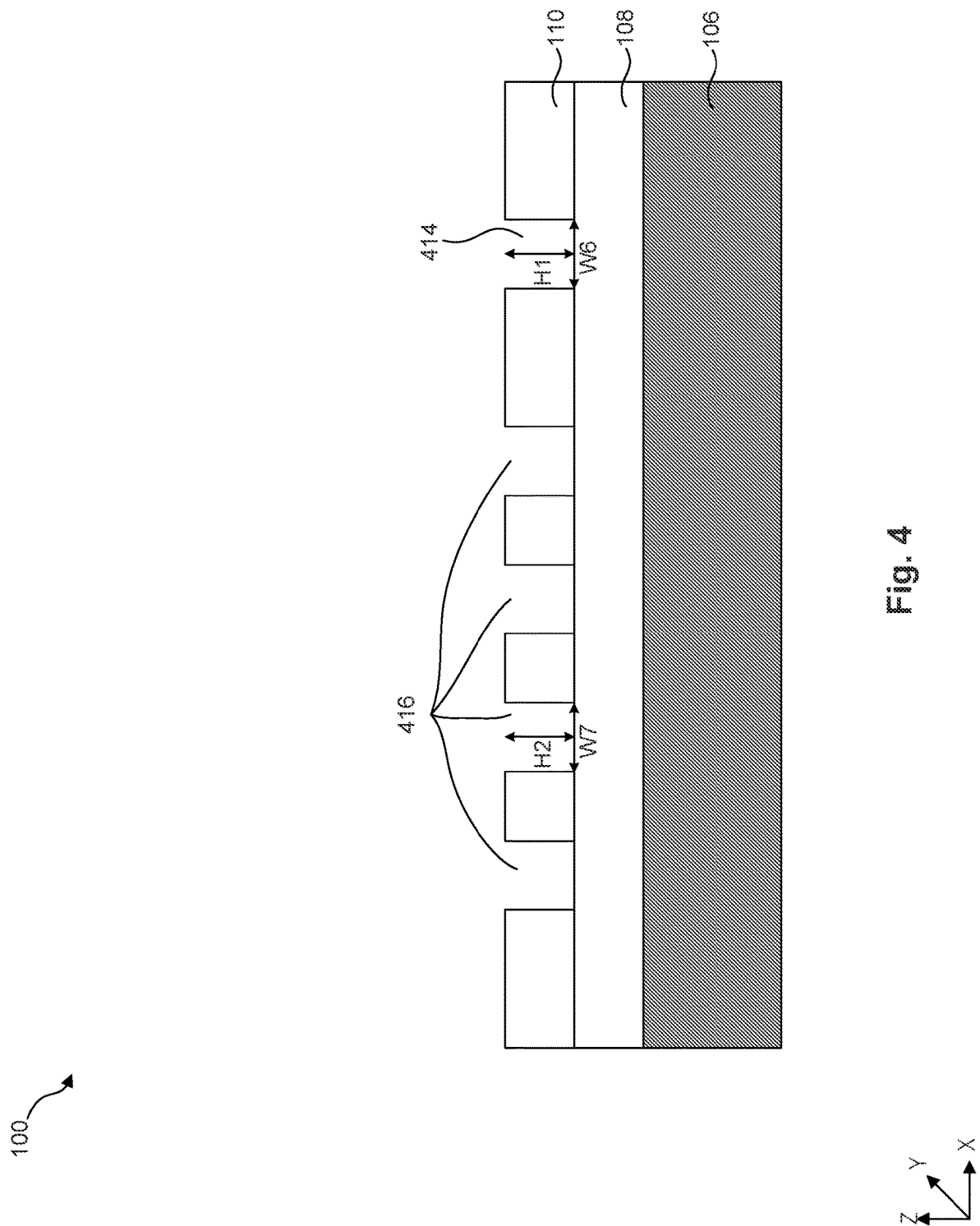

The formation of patterned template layer 110 can include sequential operations of (i) depositing an oxide layer 110* on thermal oxide layer 108, as shown in FIG. 3, and (ii) patterning oxide layer 110* to form trenches 414-416, as shown in FIG. 4. The deposition of oxide layer 110* can include depositing a layer of $SiO_2$ or other suitable oxide materials with a low refractive index on thermal oxide layer 108 using a CVD process, an LPCVD process, a PECVD, or other suitable chemical deposition processes. In some embodiments, oxide layer 110* can be deposited using a precursor, such as tetraethylorthosilicate (TEOS), in a CVD process at a temperature of about 650° C. to about 750° C. or in an LPCVD process at a temperature of about 400° C. to about 750° C.

The patterning of oxide layer 110* can include using a lithography process and dry or wet etch processes. In some embodiments, the dry etch process can include using etchants having a fluorine-containing gas (e.g., $CF_4$, $SF_6$, $CH_2F_2$, $CHF_3$, and/or $C_2F_6$), a chlorine-containing gas (e.g., $Cl_2$, $CHCl_3$, $CCl_4$, and/or $BCl_3$), a bromine-containing gas (e.g., HBr and/or $CHBR_3$), or combinations thereof. In some embodiments, the wet etch process can include etching in diluted hydrofluoric acid (DHF), potassium hydroxide (KOH) solution, ammonia, a solution containing hydrofluoric acid (HF), nitric acid ($HNO_3$), acetic acid ($CH_3COOH$), or combinations thereof. The processes included in the patterning of oxide layer 110* can be adequately controlled to achieve trenches 414-416 with well-defined sidewall profiles (e.g., substantially linear profiles) and minimal surface roughness (e.g., less than 1 nm).

Figure 5:
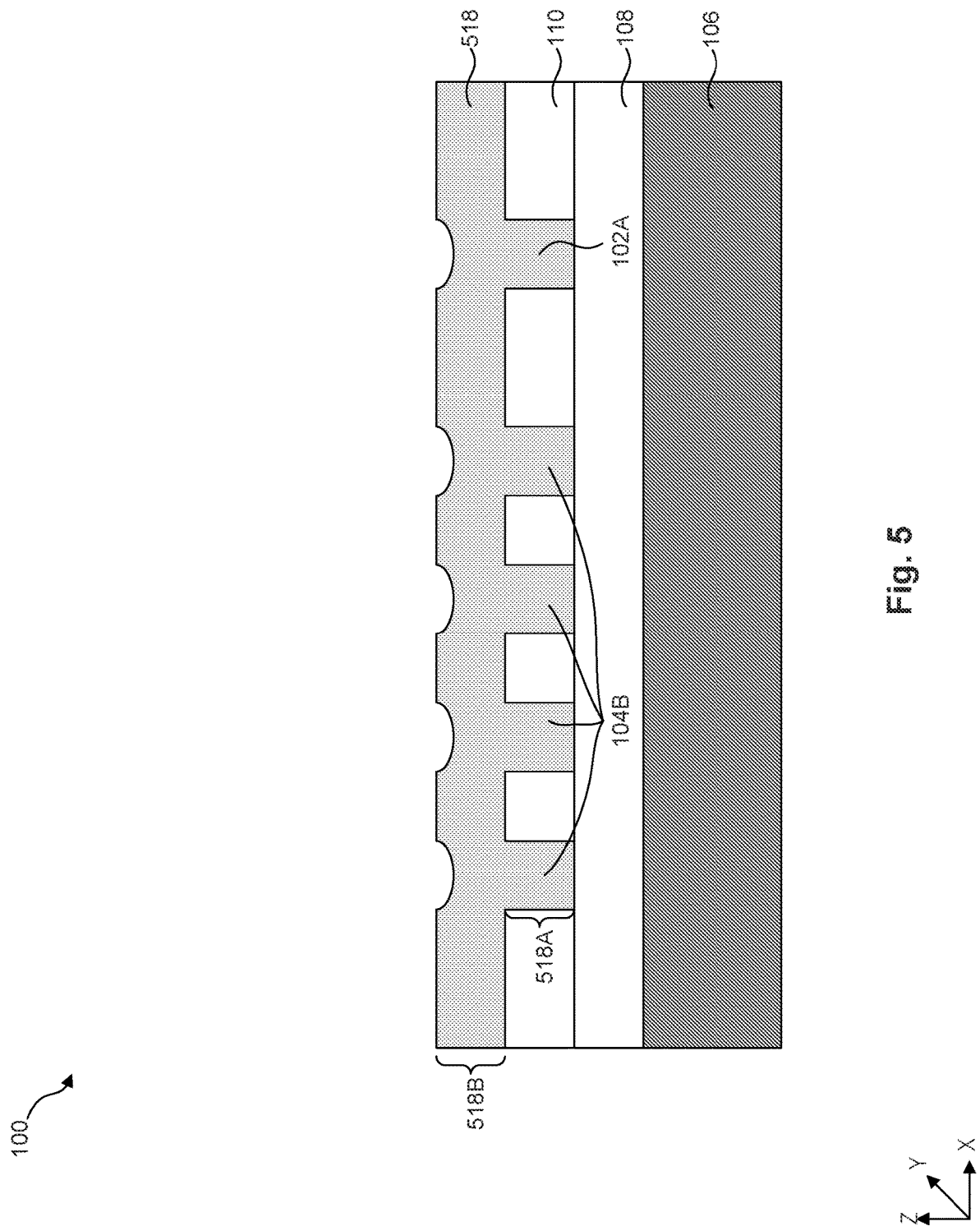
Figure 6:
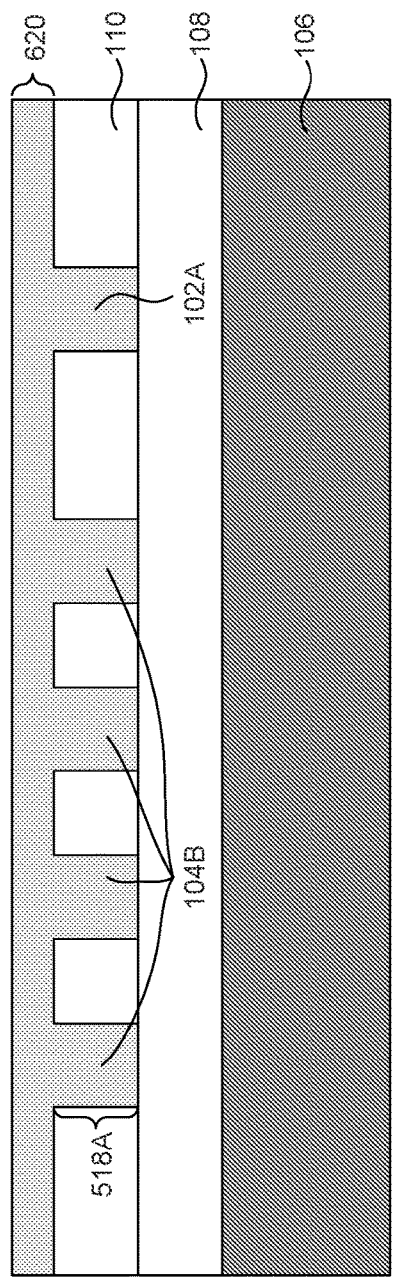
Figure 7:
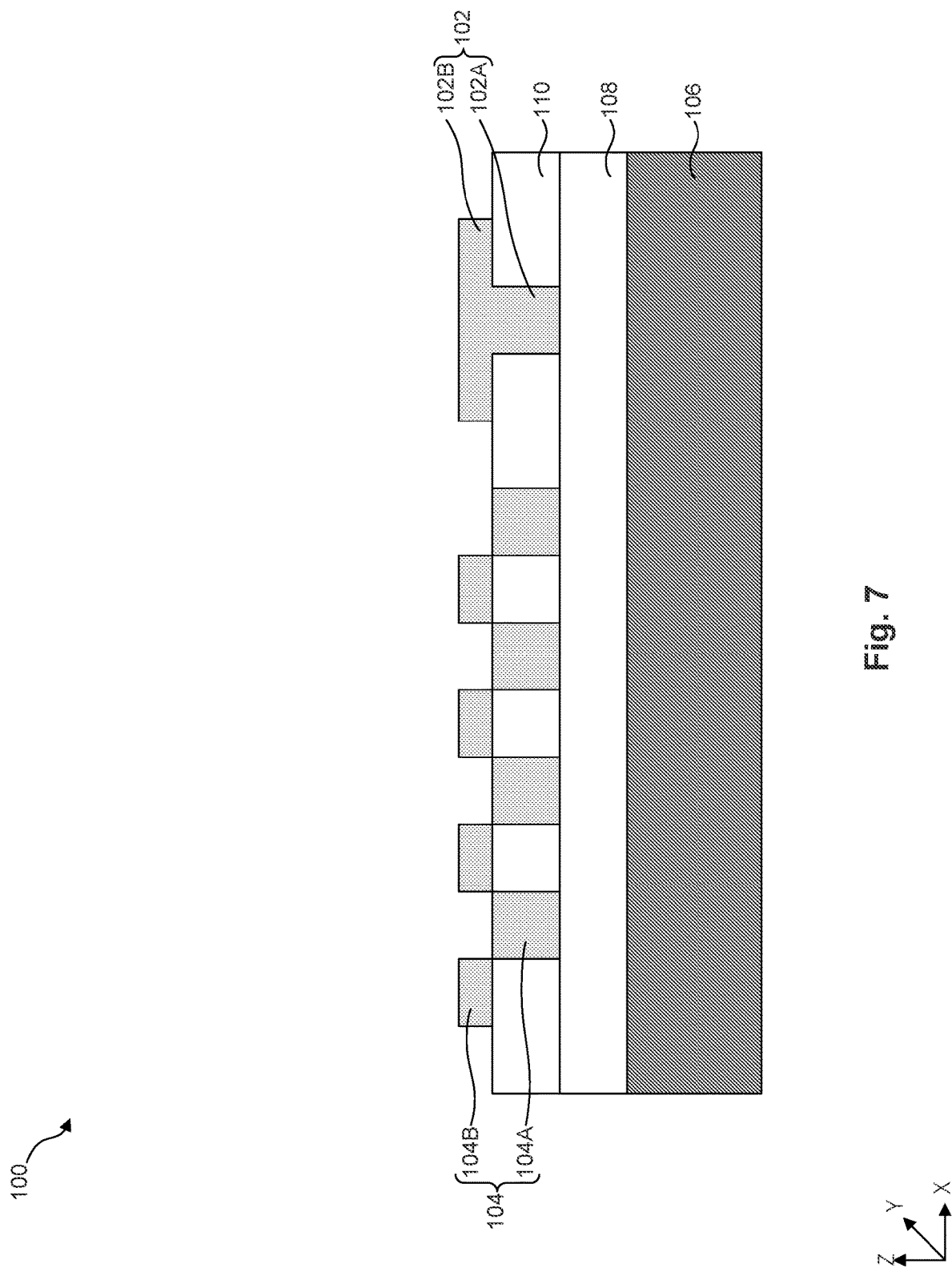

Referring to FIG. 2, in operation 215, a waveguide and a grating coupler are formed on the patterned template layer. For example, as described with FIGS. 5-7, waveguide 102 and grating coupler 104 are formed on patterned template layer 110. The formation of waveguide 102 and grating coupler 104 can include sequential operations of (i) depositing a high refractive index material layer 518 on patterned template layer 110 to form a layer portion 518A within trenches 414-416 and a layer portion 518B on the top surface of patterned template layer 110, as shown in FIG. 5, (ii) performing a chemical mechanical polishing (CMP) process on layer portion 518B to form a polished layer 620 extending out of trenches 414-416, as shown in FIG. 6, and (iii) patterning polished layer 620 to form slab portion 102B and top grating lines 104B, as shown in FIG. 7.

Layer portion 518A disposed within trench 414 (FIG. 4) forms rib portion 102A of waveguide 102, and layer portion 518A disposed within trenches 416 (FIG. 4) forms the array of bottom grating lines 104A of grating coupler 104. As a result, the well-defined sidewall profiles (e.g., substantially linear profiles) of trenches 414-416 with minimal surface roughness (e.g., less than 1 nm) are transferred to the sidewall profiles of rib portion 102A and bottom grating lines 104A. Thus, with the use of patterned template layer 110, rib portion 102A and bottom grating lines 104A can be formed with thick (e.g., greater than 200 nm) layers of high refractive index materials in a process that is less complicated than other methods of forming waveguides and/or grating couplers with thick layers of high refractive index materials. Also, with the use of patterned template layer 110, rib portion 102A and bottom grating lines 104A can be formed with smoother surfaces (e.g., surface roughness less than 1 nm) and better defined sidewall profiles than other waveguides and/or grating couplers formed without a patterned template layer.

The deposition of layer 518 can include depositing a layer of high refractive index material (e.g., SiN) with a thickness of about 200 nm to about 1000 nm in an LPCVD process at a high temperature ranging from about 600° C. to about 800° C., in a PECVD process at a low temperature ranging from about 100° C. to about 400° C., or in other suitable deposition processes for high refractive index materials. The layer of high refractive index material deposited in the LPCVD process can have a lower concentration of hydrogen bonds compared to that deposited in the PECVD process. The high temperature of the LPCVD process helps to break and remove the hydrogen bonds in layer 518. The presence of hydrogen bonds negatively impacts the optical quality of the layer of high refractive index material in layer 518. As a result, in some embodiments, layer 518 can be deposited using the LPCVD process instead of the PECVD process to form the layer of high refractive index material with a higher optical quality. On the other hand, in some embodiments, layer 518 can be deposited using the PECVD process instead of the LPCVD process if the high temperature processing of the LPCVD process is not compatible with the other processes included in the formation of optical device 100.

The CMP process can include polishing layer portion 518B to form polished layer 620 with a thickness less than about 300 nm (e.g., about 50 nm, about 100 nm, or about 150 nm). If the thickness of polished layer 620 is greater than about 300 nm, the subsequent patterning process can require complex processes due to the challenges of patterning high refractive index material with a thickness greater than 300 nm, as discussed above. The patterning of polished layer 620 can include using a lithography process and dry or wet etch processes. In some embodiments, the dry etch process can include using etchants having a fluorine-containing gas (e.g., HF, $F_2$). In some embodiments, the wet etch process can include etching in phosphoric acid ($H_3PO_4$).

Figure 8:
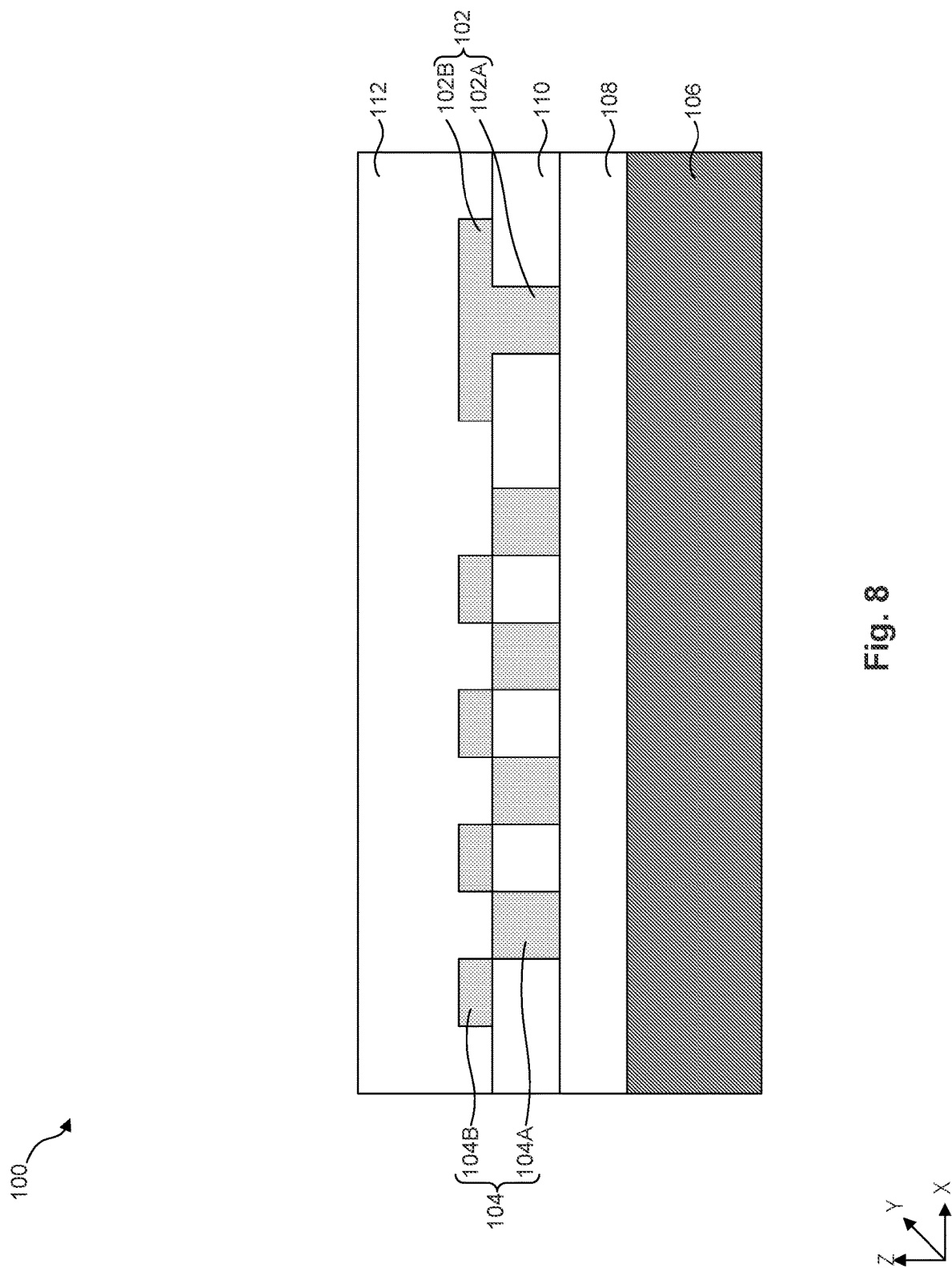

Referring to FIG. 2, in operation 220, a cladding layer is formed on the waveguide and grating coupler. For example, as shown in FIG. 8, cladding layer 112 is formed on waveguide 102 and grating coupler 104. The formation of cladding layer 112 can include depositing a layer of $SiO_2$ or other suitable oxide materials with a low refractive index using a CVD process, an LPCVD process, a PECVD, or other suitable chemical deposition processes, followed by a CMP process. In some embodiments, the a layer of $SiO_2$ can be deposited using a precursor, such as tetraethylorthosilicate (TEOS), in a CVD process at a temperature of about 650° C. to about 750° C. or in an LPCVD process at a temperature of about 400° C. to about 750° C.

In some embodiments, instead of or after performing operation 220 on the structure of FIG. 7, operations 210-215 can be repeated after operation 215 to form stacks of waveguide 102 and grating coupler 104 on the structure of FIG. 7.

Figure 9:
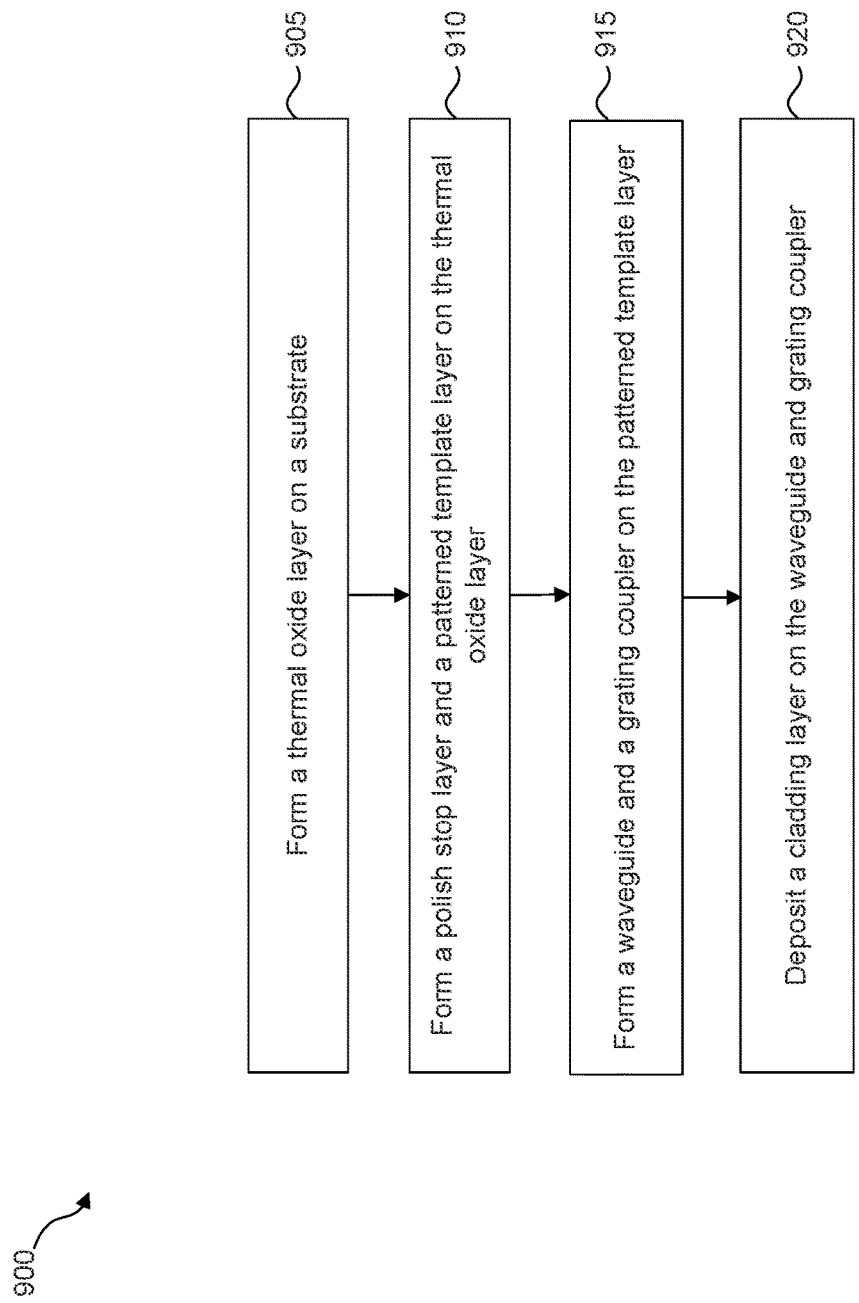
FIG. 9 is a flow diagram of a method for fabricating an optical device with a waveguide and an optical coupling device, in accordance with some embodiments.

FIG. 9 is a flow diagram of an example method 900 for fabricating optical device 100 with waveguide 102 and grating coupler 104, according to some embodiments. For illustrative purposes, the operations illustrated in FIG. 9 will be described with reference to the example fabrication process for forming optical device 100 with waveguide 102 and grating coupler 104 as illustrated in FIGS. 10-17. The operations can be performed in a different order or not performed depending on specific applications. Method 900 may not produce a complete optical device 100. Accordingly, additional processes can be provided before, during, and after method 900, and that some other processes may only be briefly described herein. Elements in FIGS. 10-17 with the same annotations as elements in FIGS. 1A-1D and 3-8 are described above.

Figure 10:
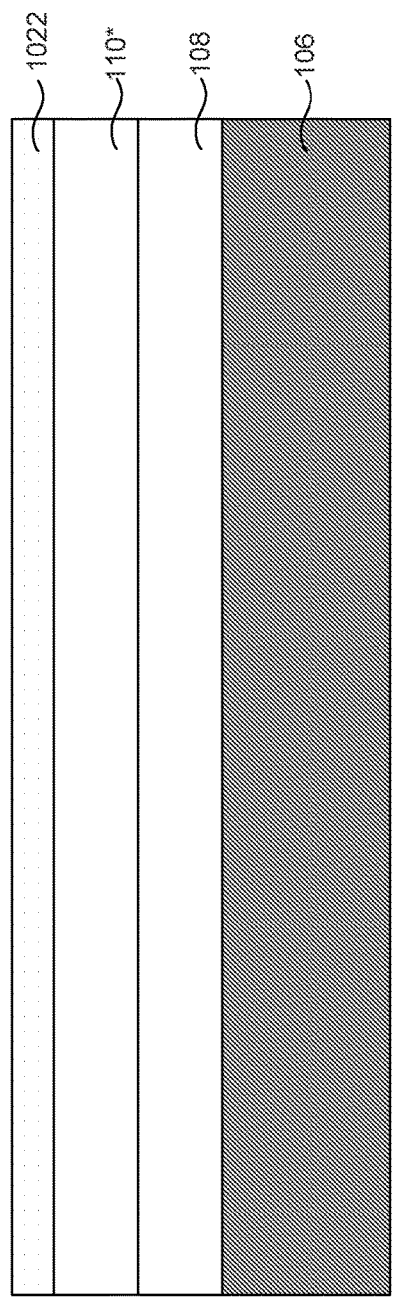
FIGS. 10-17 illustrate cross-sectional views of an optical device with a waveguide and an optical coupling device at various stages of its fabrication process, in accordance with some embodiments.
Figure 11:
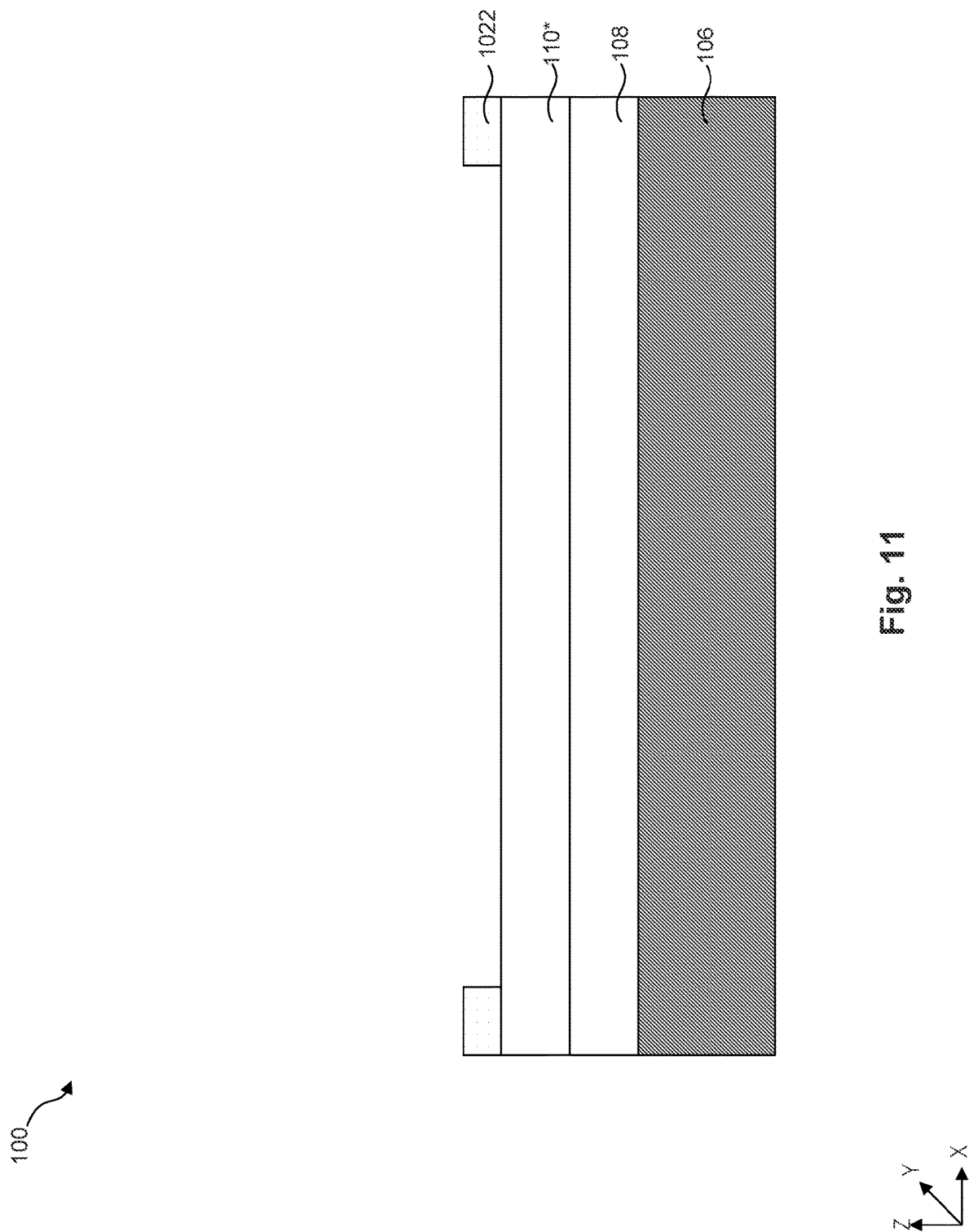
Figure 12:
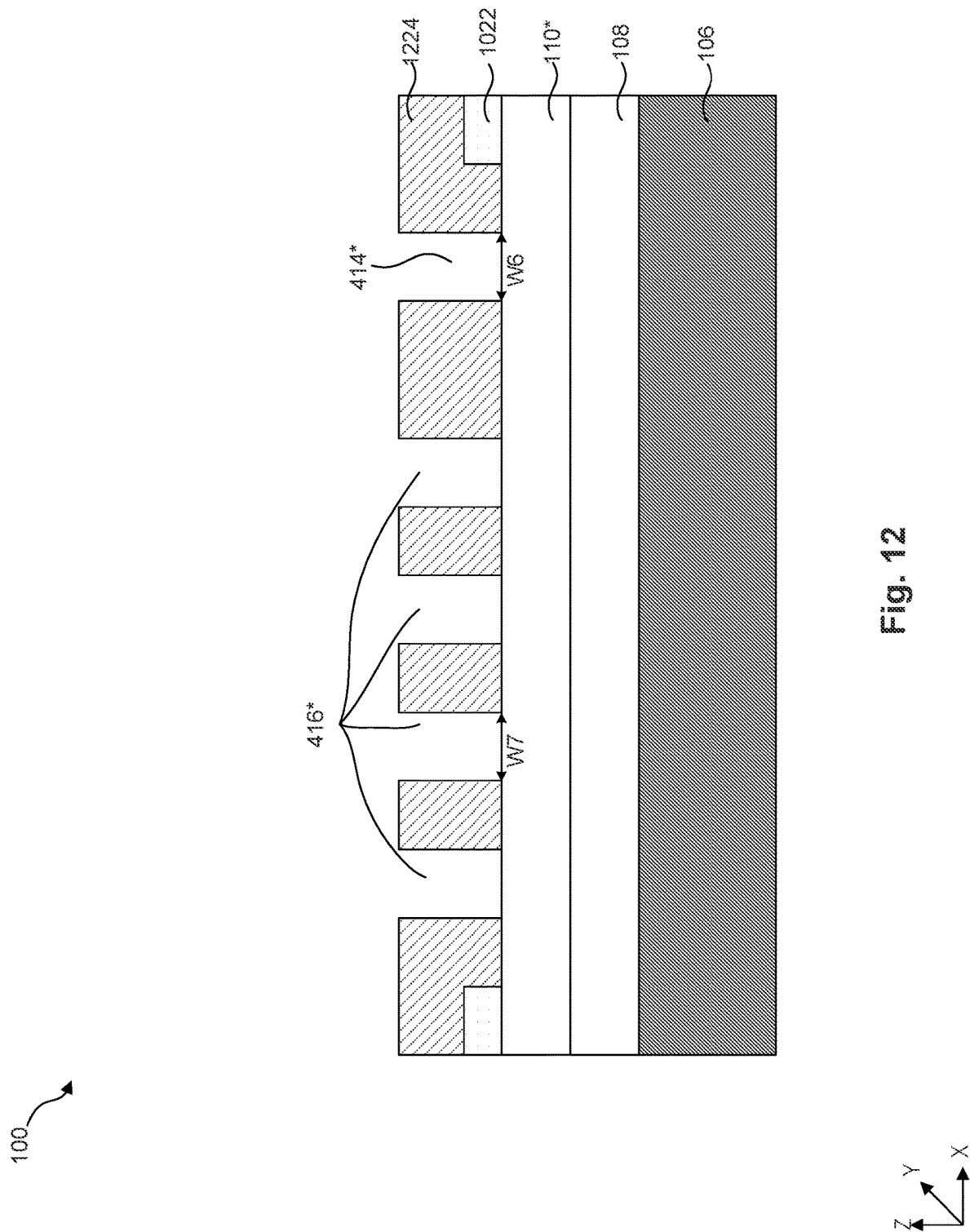

In operation 905, a thermal oxide layer is formed on a substrate. For example, as shown in FIG. 10, thermal oxide layer 108 is formed on substrate 106 in an operation similar to operation 205 described with reference to FIG. 3.

Figure 13:
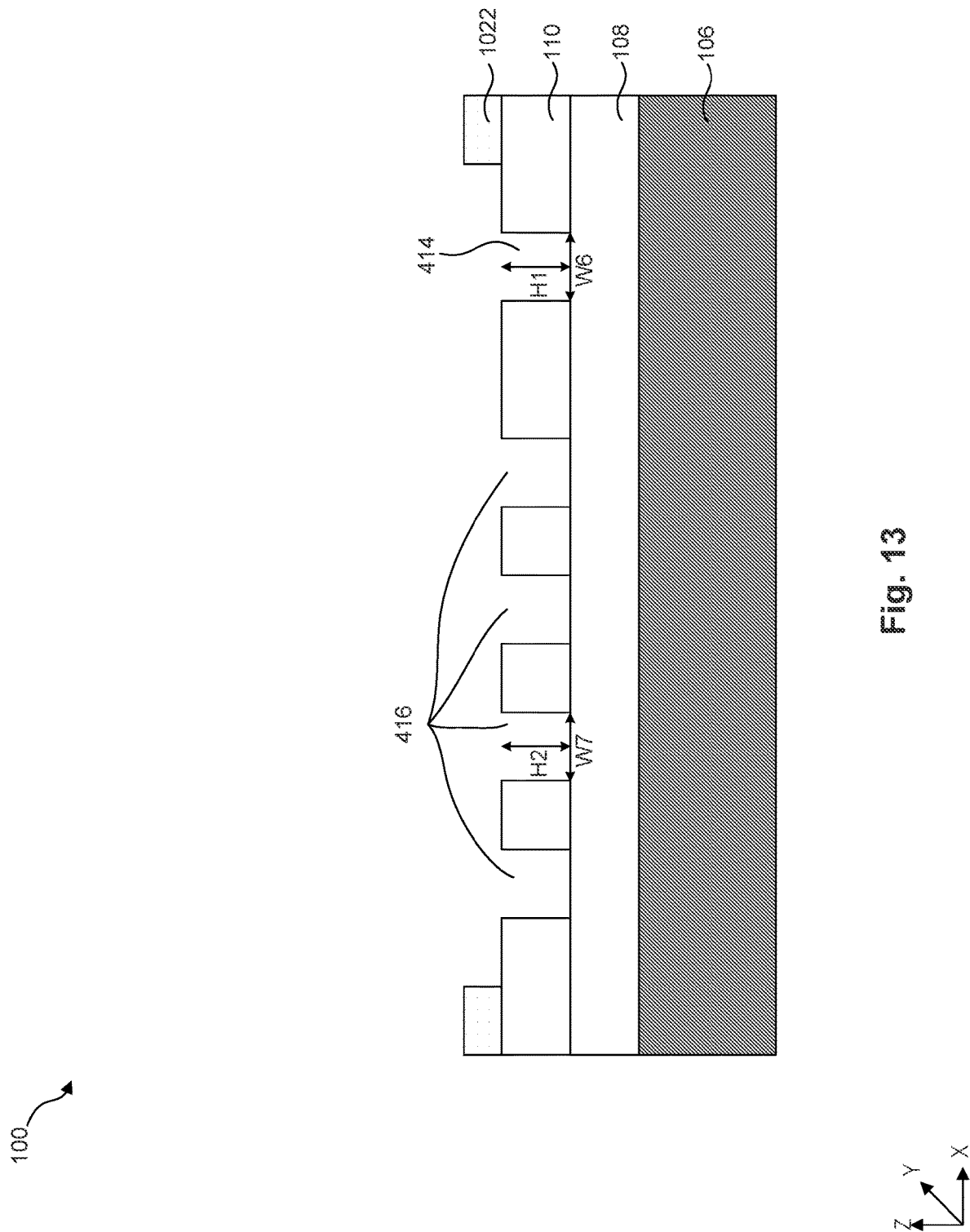

Referring to FIG. 9, in operation 910, a polish stop layer and a patterned template layer are formed on the thermal oxide layer. For example, as described with FIGS. 10-13, a polish stop layer 1022 and patterned template layer 110 with trenches 414-416 are formed on thermal oxide layer 108. The formation of polish stop layer 1022 and patterned template layer 110 can include sequential operations of (i) depositing oxide layer 110* on thermal oxide layer 108, as shown in FIG. 10, (ii) depositing a polish stop layer 1022 on oxide layer 110*, as shown in FIG. 10, (iii) patterning polish stop layer 1022 to form the structure of FIG. 11, (iv) forming a patterned masking layer 1224 (e.g., photoresist layer) with openings 414*-416* on the structure of FIG. 11 to form the structure of FIG. 12, (v) etching oxide layer 110* through openings 414*-416* to form respective trenches 414-416, as shown in FIG. 13.

The deposition and etching of oxide layer 110* can be similar to the deposition and etching processes described in operation 210. The deposition of polish stop layer 1022 can include depositing a layer of metallic material or insulating material different from the material of oxide layer 110* using a CVD process or other suitable chemical deposition processes. The thickness of polish stop layer 1022 depends on thicknesses T2 and T4 of subsequently-formed slab portion 102B and top grating lines 104B. Polish stop layer 1022 can control the thickness T2 and T4 during formation of slab portion 102B and top grating lines 104B, which is described in further detail below. The patterning of polish stop layer 1022 can include using a lithography process and dry or wet etch processes.

Figure 14:
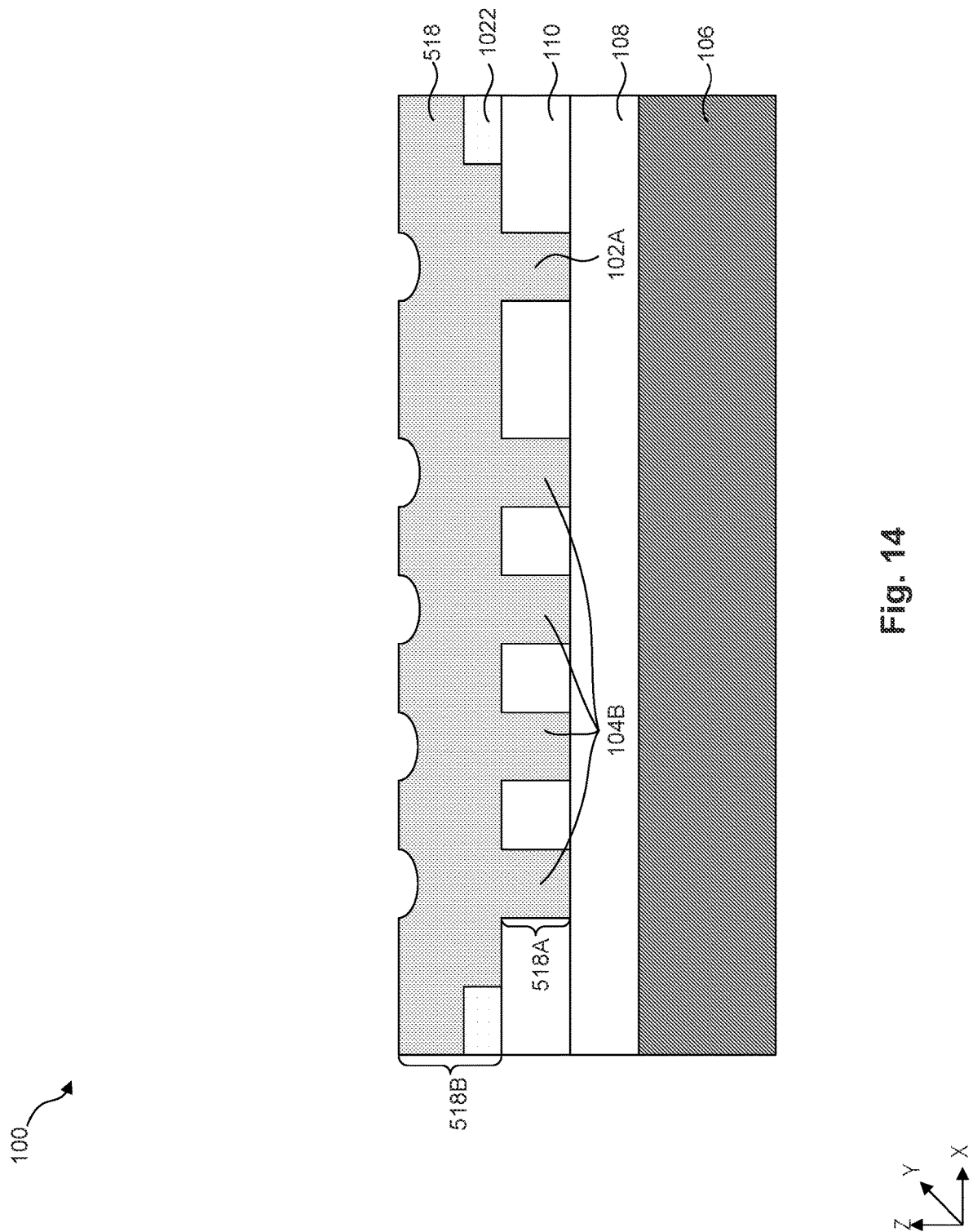
Figure 15:
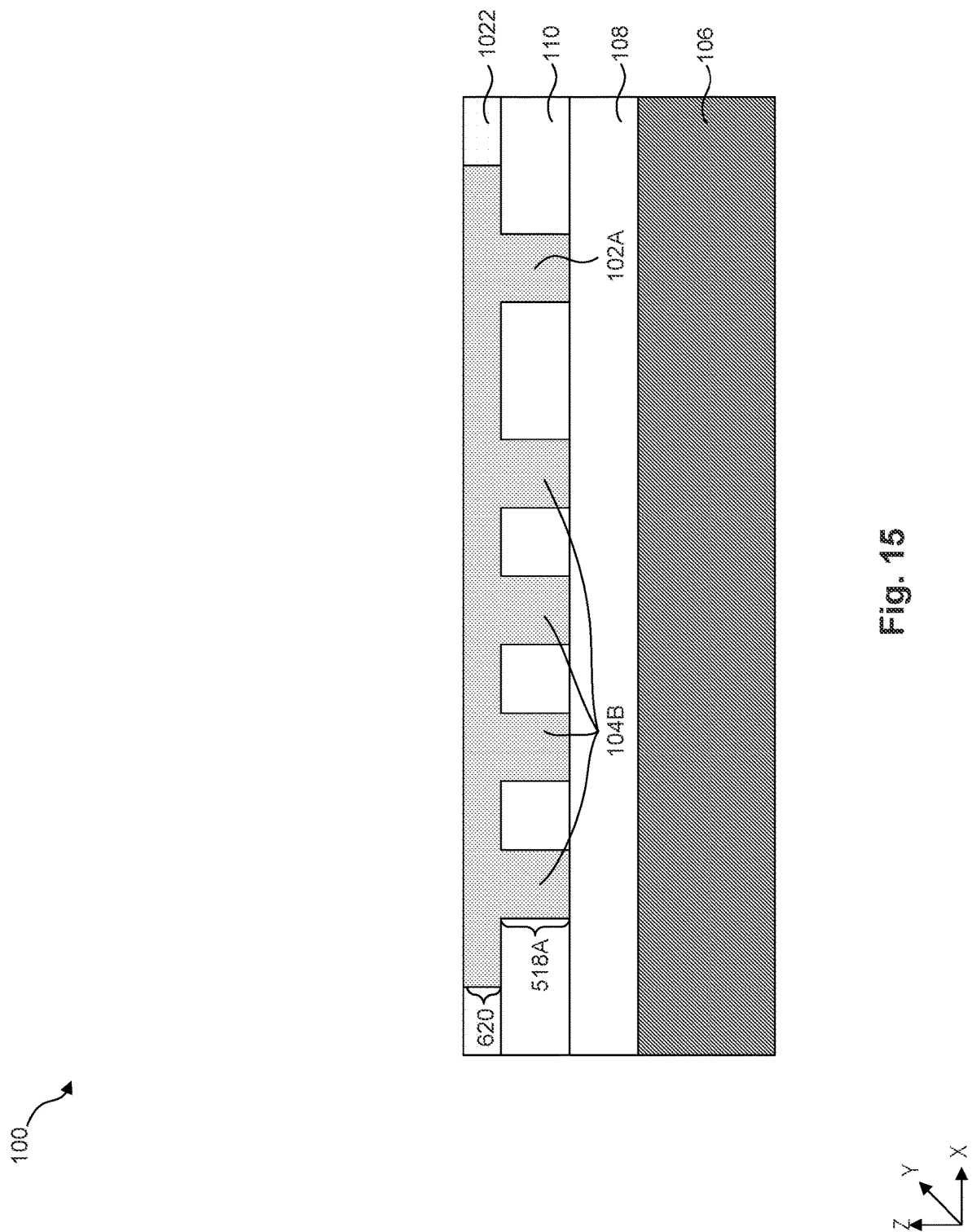
Figure 16:
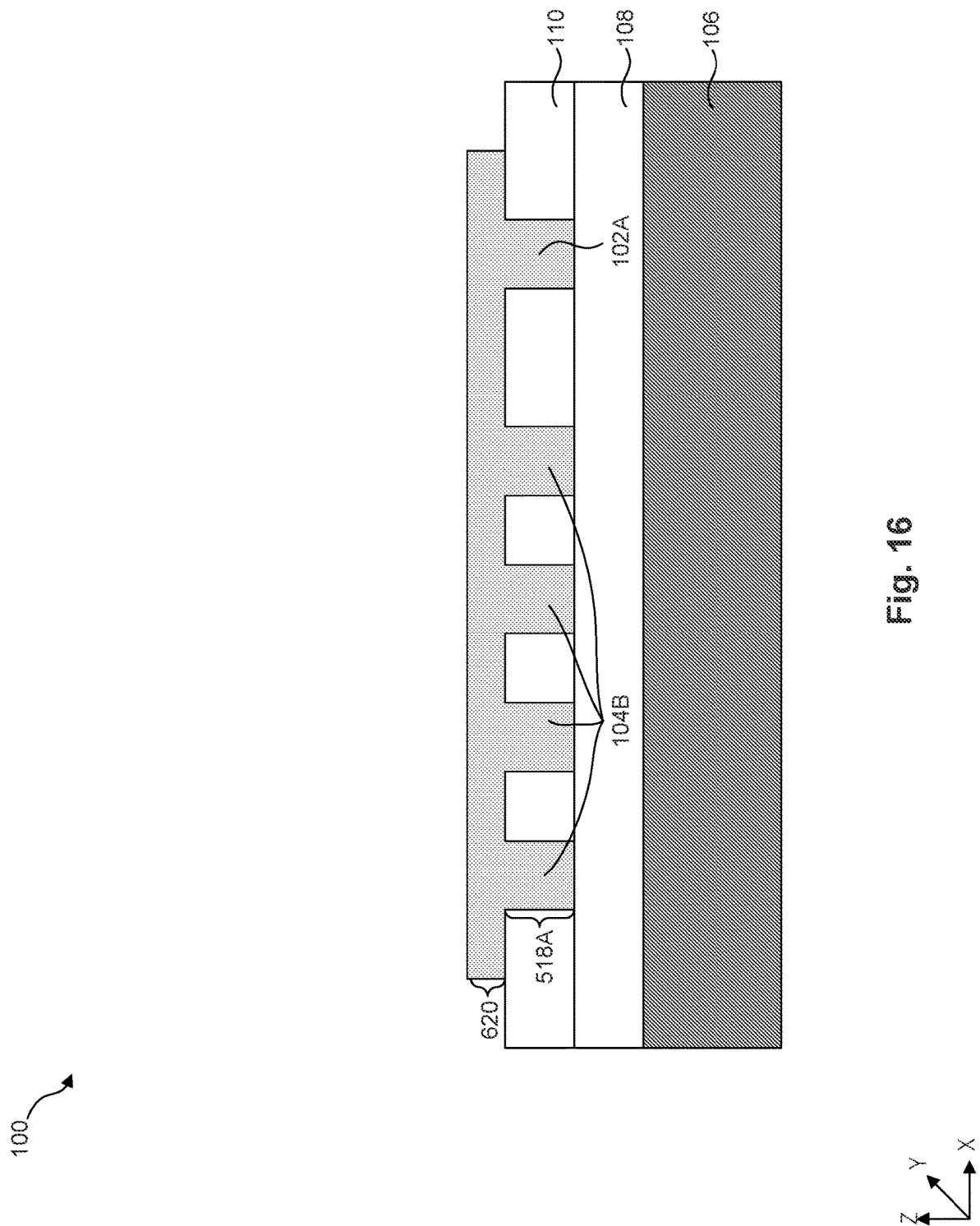

Referring to FIG. 9, in operation 915, a waveguide and a grating coupler are formed on the patterned template layer. For example, as described with FIGS. 14-17, waveguide 102 and grating coupler 104 are formed on patterned template layer 110. The formation of waveguide 102 and grating coupler 104 can include sequential operations of (i) depositing high refractive index material layer 518 on the structure of FIG. 13, as shown in FIG. 14, (ii) performing a chemical mechanical polishing (CMP) process on layer portion 518B to form a polished layer 620 extending out of trenches 414-416, as shown in FIG. 15, (iii) removing polish stop layer 1022 to form the structure of FIG. 16, and (iv) patterning polished layer 620 to form slab portion 102B and top grating lines 104B, as shown in FIG. 17.

The deposition of layer 518 and the patterning of polished layer 620 can be similar to the deposition and patterning processes described in operation 215. The CMP process can include polishing layer portion 518B until a top surface of polished layer 620 is substantially coplanar with a top surface of polish stop layer 1022. The removal of polish stop layer 1022 after the CMP process can include a dry or wet etch process for removing metallic materials or insulation materials.

Referring to FIG. 9, in operation 920, a cladding layer is formed on the waveguide and grating coupler. For example, as shown in FIG. 17, cladding layer 112 is formed on waveguide 102 and grating coupler 104 in an operation similar to operation 220 described with reference to FIG. 8.

Figure 17:
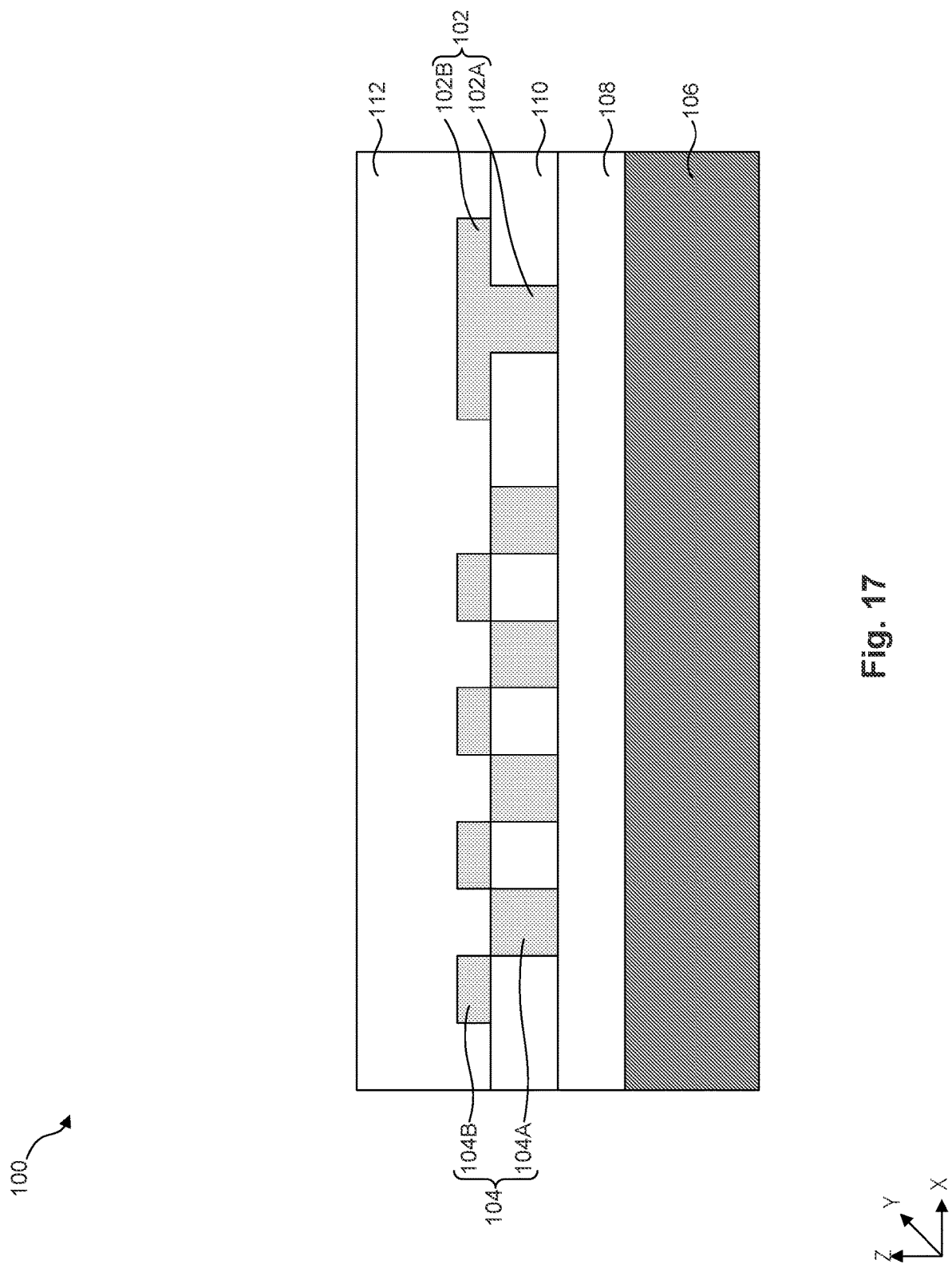

In some embodiments, instead of or after performing operation 920 on the structure of FIG. 17, operations 910-915 can be repeated after operation 915 to form stacks of waveguide 102 and grating coupler 104.

Figure 18:
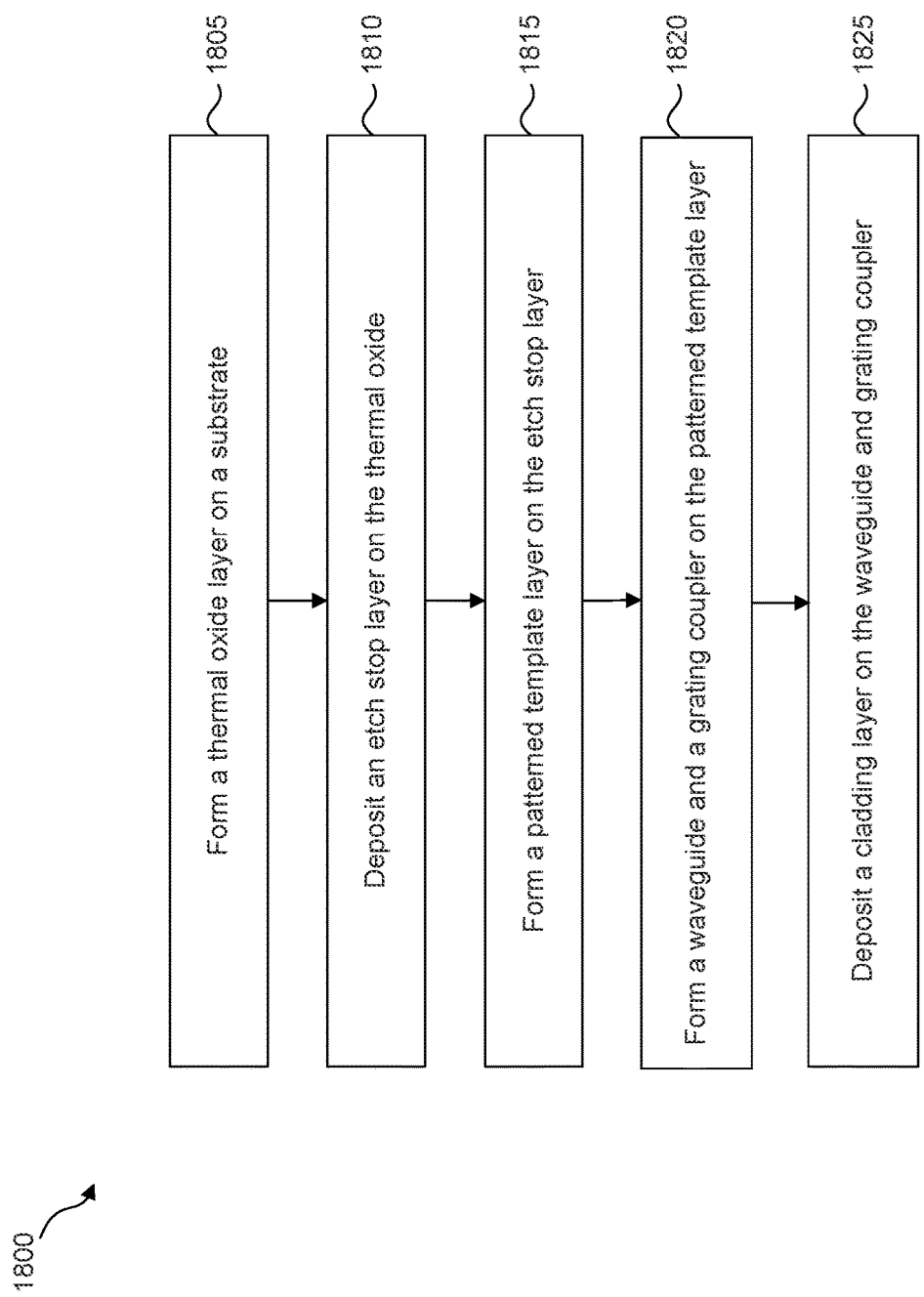
FIG. 18 is a flow diagram of a method for fabricating an optical device with a waveguide and an optical coupling device, in accordance with some embodiments.
Figure 19:
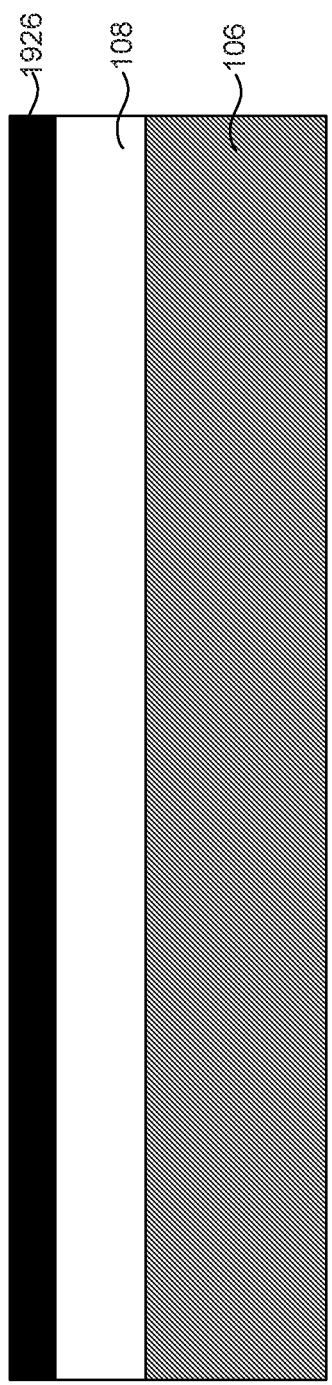
FIGS. 19-21 illustrate cross-sectional views of an optical device with a waveguide and an optical coupling device at various stages of its fabrication process, in accordance with some embodiments.
Figure 20:
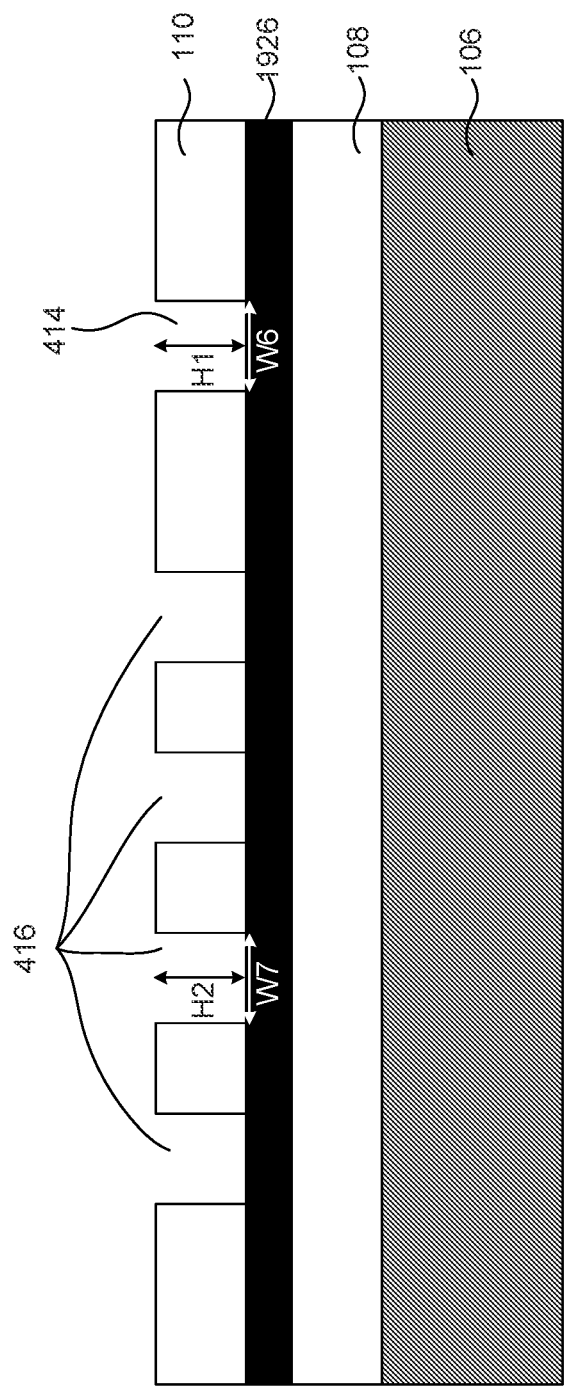
Figure 21:
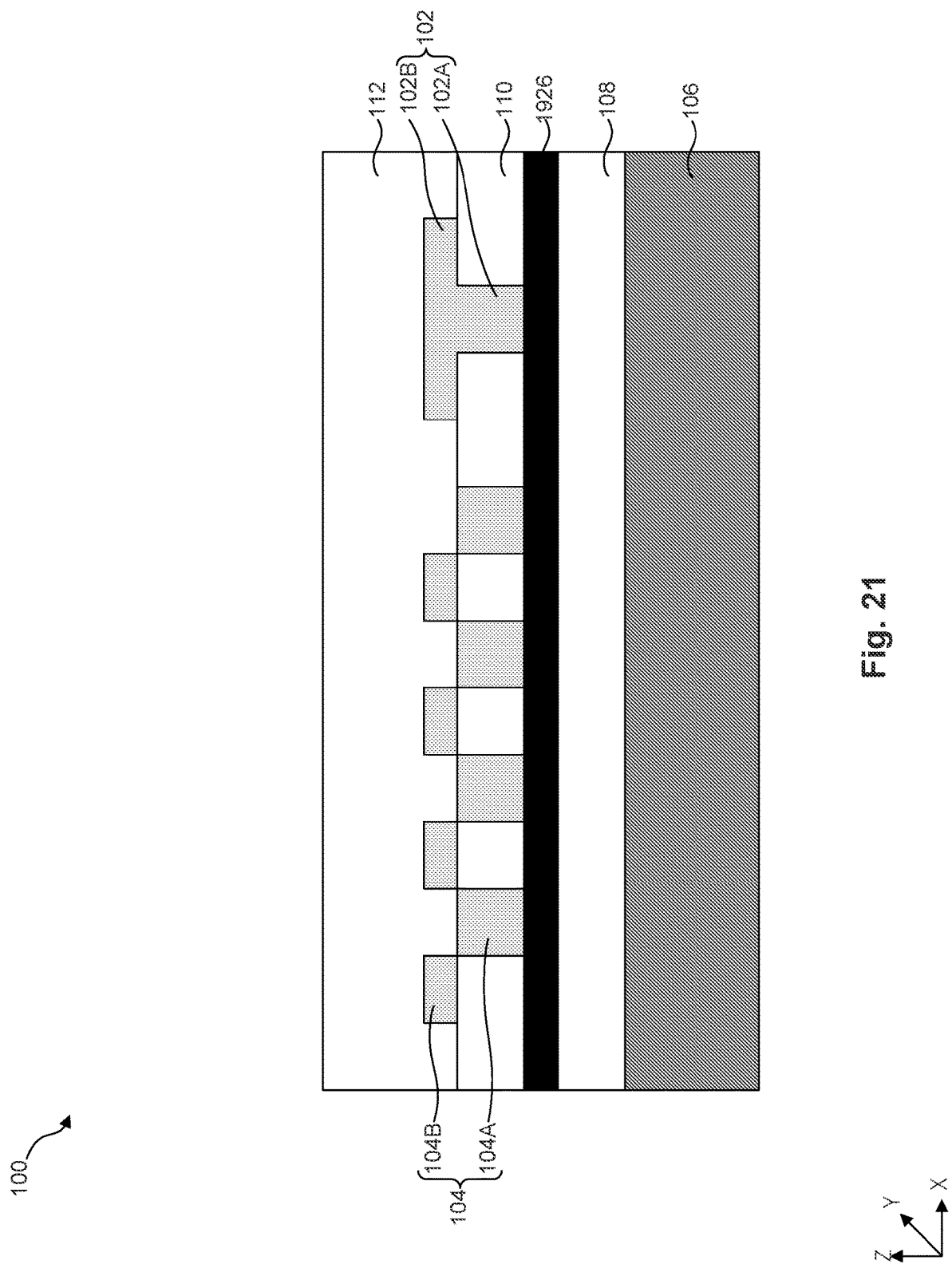

In some embodiments, optical device 100 can include an etch stop layer 1926 (as shown in FIG. 21) between thermal oxide layer 108 and patterned template layer 110 to protect thermal oxide layer 108 during formation of patterned template layer 110. FIG. 18 is a flow diagram of an example method 1800 for fabricating optical device 100 with etch stop layer 1926, according to some embodiments. For illustrative purposes, the operations illustrated in FIG. 18 will be described with reference to the example fabrication process for forming optical device 100 with etch stop layer 1926 as illustrated in FIGS. 19-21. The operations can be performed in a different order or not performed depending on specific applications. Method 1800 may not produce a complete optical device 100. Accordingly, additional processes can be provided before, during, and after method 1800, and that some other processes may only be briefly described herein. Elements in FIGS. 19-21 with the same annotations as elements in FIGS. 1A-1D, 3-8, and 10-17 are described above.

In operation 1805, a thermal oxide layer is formed on a substrate. For example, as shown in FIG. 19, thermal oxide layer 108 is formed on substrate 106 in an operation similar to operation 205 described with reference to FIG. 3.

Referring to FIG. 18, in operation 1810, an etch stop layer is formed on the thermal oxide layer. For example, as shown in FIG. 19, etch stop layer 1926 is formed on thermal oxide layer 108. The formation of etch stop layer 1926 can include depositing a layer of insulating material, such as silicon nitride ($SiN_x$), silicon oxynitride (SiON), silicon carbide (SiC), nitrogen doped silicon carbide (SiCN), boron nitride (BN), silicon boron nitride (SiBN), silicon carbon boron nitride (SiCBN), and combinations thereof using a CVD process or other suitable deposition processes for insulation materials.

Referring to FIG. 18, in operation 1815, a patterned template layer is formed on the etch stop layer. For example, as shown in FIG. 20, patterned template layer 110 is formed on etch stop layer 1926 in an operation similar to operation 210 described with reference to FIGS. 3-4.

Referring to FIG. 18, in operation 1820, a waveguide and a grating coupler are formed on the patterned template layer. For example, as shown in FIG. 21, waveguide 102 and grating coupler 104 are formed on patterned template layer 110 in an operation similar to operation 215 described with reference to FIGS. 5-7.

Referring to FIG. 18, in operation 1825, a cladding layer is formed on the waveguide and grating coupler. For example, as shown in FIG. 21, cladding layer 112 is formed on waveguide 102 and grating coupler 104 in an operation similar to operation 220 described with reference to FIG. 8.

In some embodiments, instead of or after performing operation 1825, operations 1815-1820 can be repeated after operation 1820 to form stacks of waveguide 102 and grating coupler 104.

Figure 22:
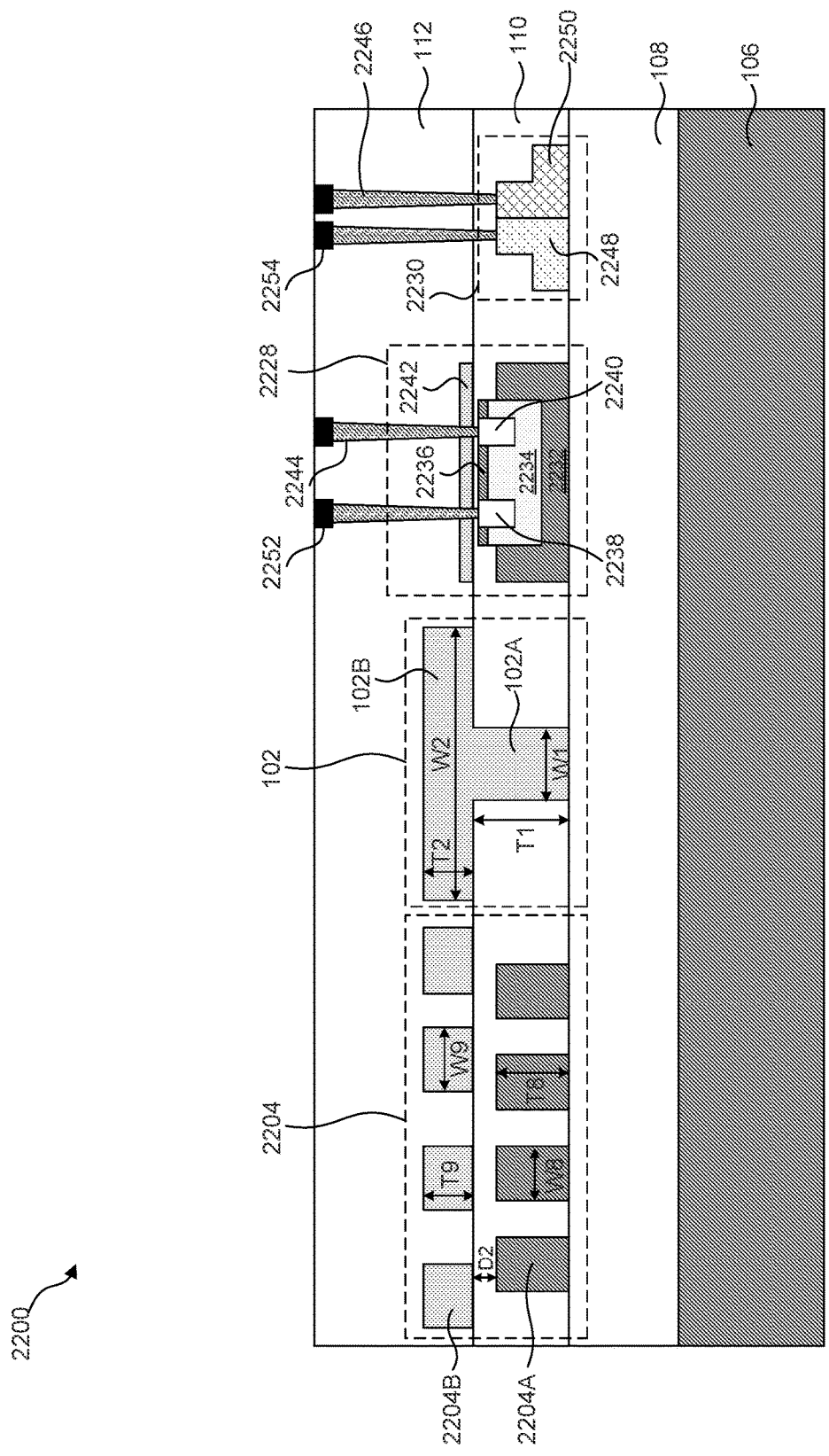
FIG. 22 illustrates a cross-sectional view of an optical device with a waveguide, an optical coupling device, and an image sensor, in accordance with some embodiments.

FIG. 22 illustrates a cross-sectional view of an optical device 2200 with waveguide 102 and an optical coupling device 2204 (also referred to as a "grating coupler 2204"), according to some embodiments.

Optical device 2200 can include substrate 106, thermal oxide layer 108 disposed on substrate 106, patterned template layer 110 disposed on thermal oxide layer 108, and cladding layer 112 disposed on patterned template layer 110. Waveguide 102 and grating coupler 2204 can be disposed on thermal oxide layer 108. Grating coupler 2204 can be configured to optically couple waveguide 102 to an optical fiber (not shown) in a Si-PIC. In some embodiments, grating coupler 2204 can be a dual layered grating coupler with an array of bottom grating lines 2204A disposed with patterned template layer 110 and an array of top grating lines 2204B disposed within cladding layer 112. The arrays of bottom and top grating lines 2204A-2204B can be vertically spaced apart from each other by a distance D2 and can be electrically isolated from each other by patterned template layer 110. Patterned template layer 110 can also electrically isolate bottom grating lines 2204A from each other and cladding layer 112 can electrically isolate top grating lines 2204A from each other. The arrays of bottom and top grating lines 104A-104B can include a semiconductor or a dielectric material with a high refractive index, such as Si, SiN, $Al_2O_3$, $HfO_2$, and other suitable materials with a high refractive index. In some embodiments, the arrays of bottom and top grating lines 104A-104B can have a material similar to or different from each other. In some embodiments, the materials of waveguide 102 and top grating lines 104B can be similar to each other and different from the material of bottom grating lines 104A.

Each of bottom grating lines 2204A can have a thickness T8 along a Z-axis and a width W8 along an X-axis, and each of top grating lines 2204B can have a thickness T9 along a Z-axis and a width W9 along an X-axis. Thickness T8 can be greater than thickness T9 and widths W3-W4 can be equal to or different from each other. In some embodiments, thickness T8 can range from about 50 nm to about 500 nm or can be other suitable dimensions and thickness T9 can range from about 100 nm to about 1000 nm or can be other suitable dimensions.

Optical device 2200 can further include an image sensor 2228 and an isolation device 2230. In some embodiments, image sensor 2228 can include a substrate layer 2232 disposed on thermal oxide layer 108, a germanium (Ge) layer 2234 disposed partly within substrate layer 2232 and partly within patterned template layer 110, a capping layer 2236 disposed on Ge layer 2234, an n-type doped region 2238 and a p-type doped region 2240 disposed partly within Ge layer 2234 and partly within capping layer 2236, and a passivation layer 2242 disposed on patterned template layer 110. In some embodiments, capping layer 2236 can include Si and passivation layer 2242 can include a material similar to the material of waveguide 102 and/or top grating lines 104B. In some embodiments, isolation device 2230 can include an n-type doped region 2248 and a p-type doped region 2250 disposed within patterned template layer 110. The dopant concentrations of doped regions 2248-2250 can be substantially to the dopant concentrations of doped regions 2238-2240, respectively. Optical device 2200 can further include contact structures 2244-2246 disposed on doped regions 2238-2240 and 2248-2250, and via structures 2252-2254 disposed on contact structures 2244-2246.

Figure 23:
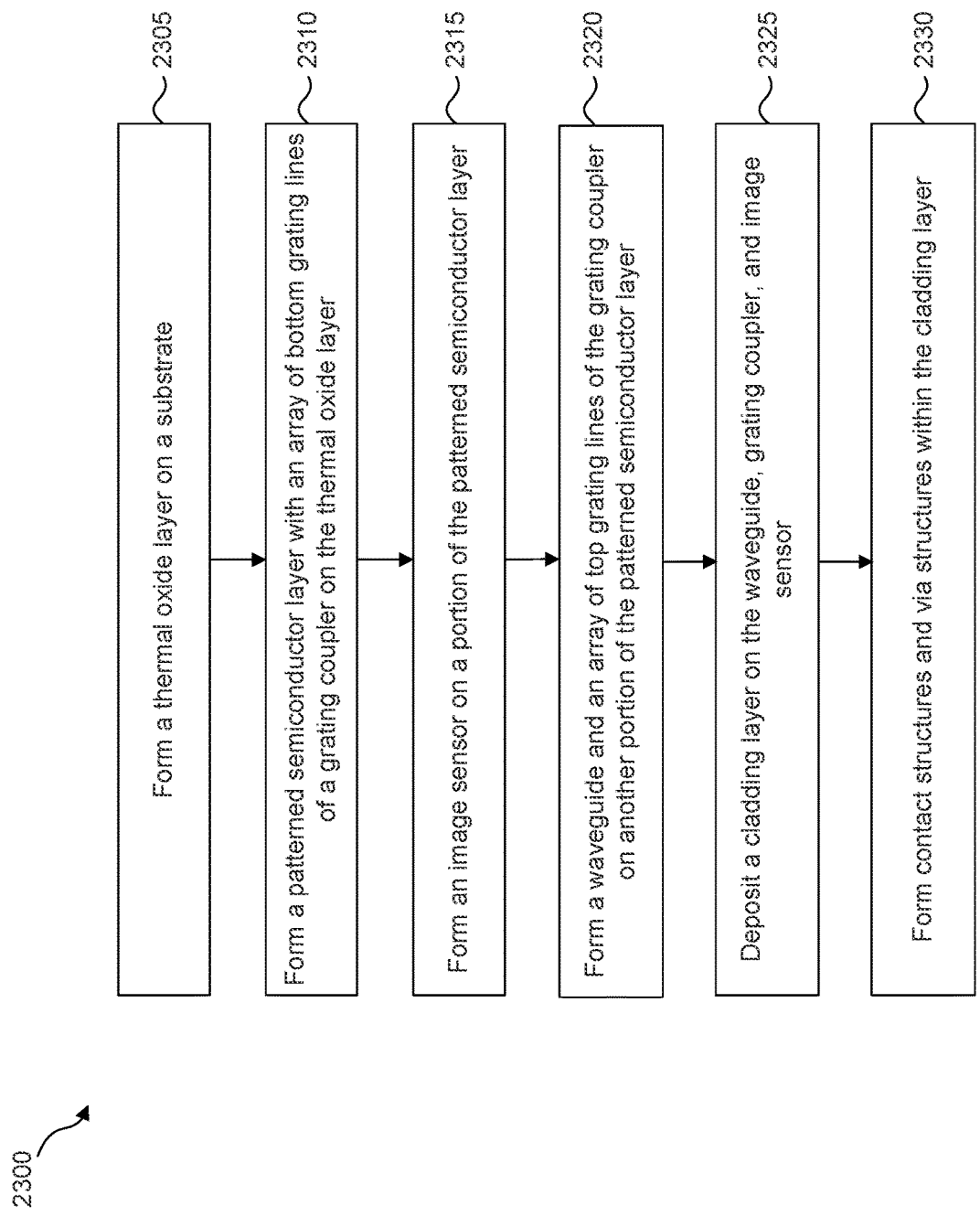
FIG. 23 is a flow diagram of a method for fabricating an optical device with a waveguide, an optical coupling device, and an image sensor, in accordance with some embodiments.

FIG. 23 is a flow diagram of an example method 2300 for fabricating optical device 2200, according to some embodiments. For illustrative purposes, the operations illustrated in FIG. 23 will be described with reference to the example fabrication process for forming optical device 2200 as illustrated in FIGS. 24-36. The operations can be performed in a different order or not performed depending on specific applications. Method 2300 may not produce a complete optical device 2200. Accordingly, additional processes can be provided before, during, and after method 2300, and that some other processes may only be briefly described herein. Elements in FIGS. 24-36 with the same annotations as elements in FIGS. 1A-1D, 3-8, 10-17, and 22 are described above.

In operation 2305, a thermal oxide layer is formed on a substrate. For example, as shown in FIG. 24, thermal oxide layer 108 is formed on substrate 106 in an operation similar to operation 205 described with reference to FIG. 3.

Referring to FIG. 23, in operation 2310, a patterned semiconductor layer with an array of bottom grating lines of a grating coupler is formed on the thermal oxide layer. For example, as described with FIGS. 24-25, a patterned semiconductor layer 2456 with array of bottom grating lines 2204A is formed on thermal oxide layer 108. The formation of patterned semiconductor layer 2456 can include sequential operations of (i) depositing a semiconductor layer 2456* on thermal oxide layer 108, as shown in FIG. 24, and (ii) patterning semiconductor layer 2456* using a lithography process and dry or wet etch process to form the structure of FIG. 25. After the formation of patterned semiconductor layer 2456, oxide layer 110* can be formed on the structure of FIG. 25, as shown in FIG. 26

Figure 24:
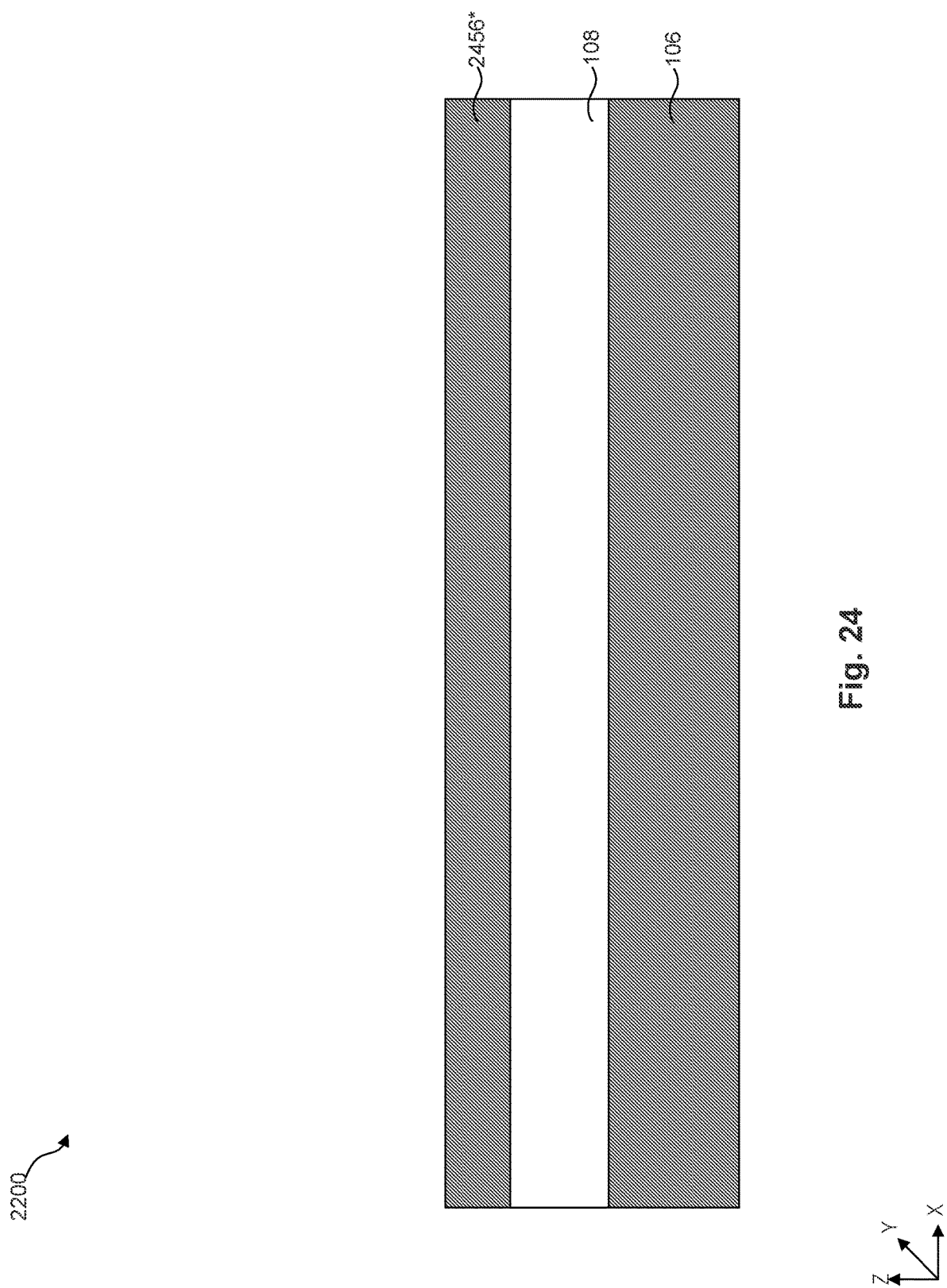
FIGS. 24-36 illustrate cross-sectional views of an optical device with a waveguide, an optical coupling device, and an image sensor at various stages of its fabrication process, in accordance with some embodiments.
Figure 25:
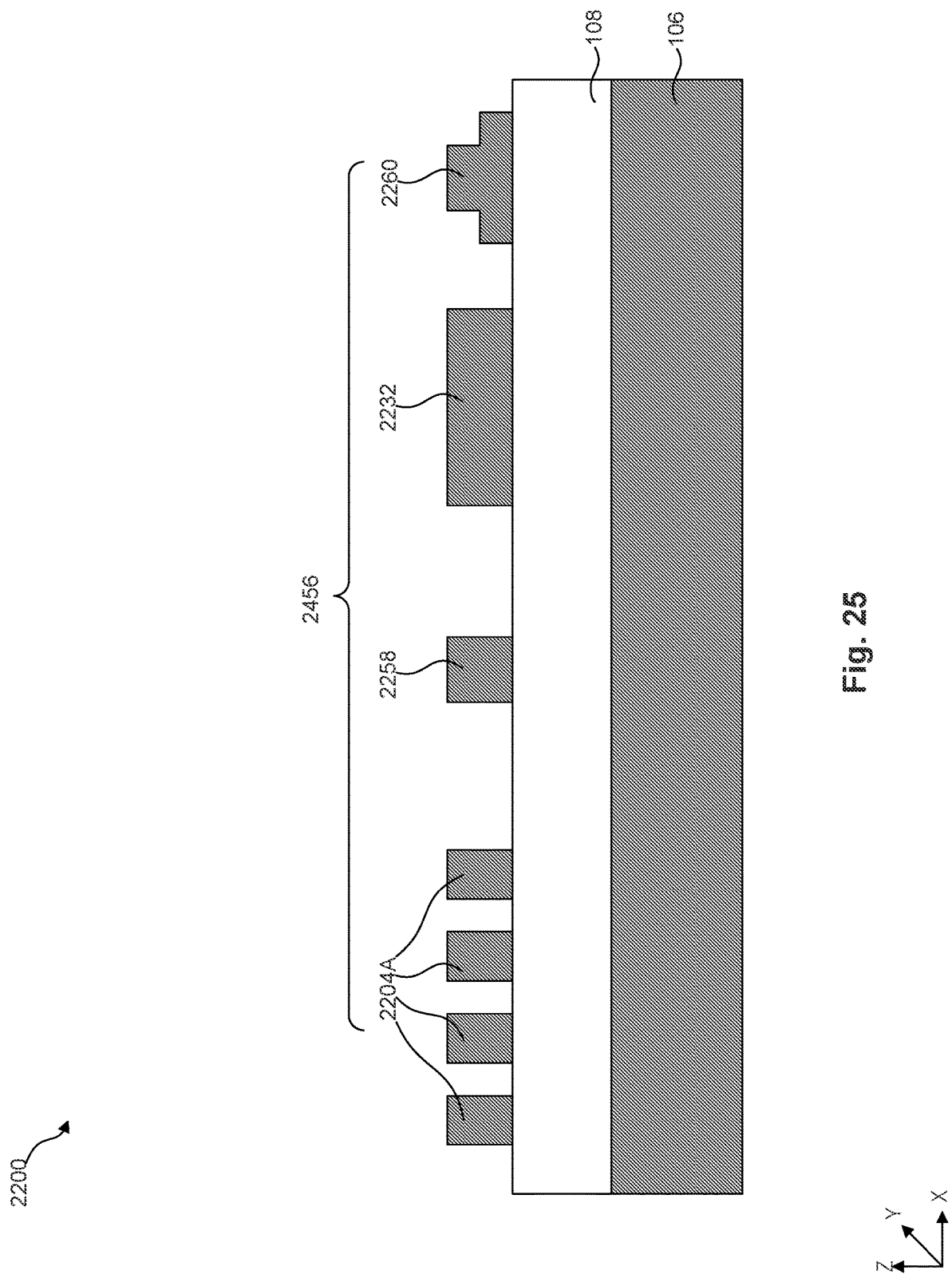
Figure 26:
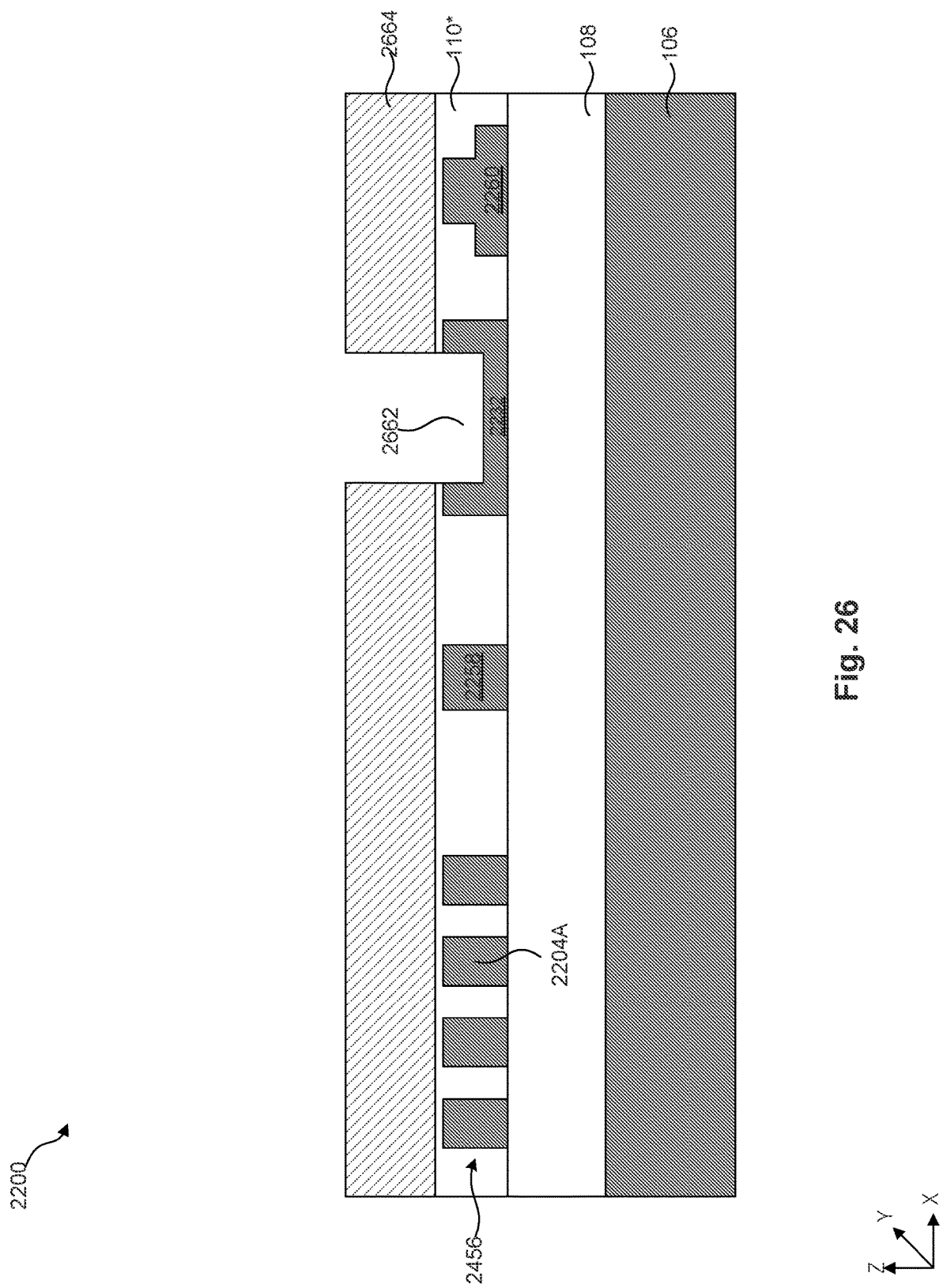

In some embodiments, an SOI substrate can be provided instead of forming the structure of FIG. 24 and the silicon layer of the SOI substrate can be patterned as patterned semiconductor layer 2456 to form the structure of FIG. 25. In some embodiments, patterned semiconductor layer 2456 has (i) a first portion that forms the array of bottom grating lines 2204A, (ii) a second portion that forms a sacrificial structure 2258, which defines rib portion 102A of waveguide 102 in subsequent processing, (iii) a third portion that forms substrate layer 2232 of image sensor 2228, and (iv) a fourth portion that forms a semiconductor structure 2260, which are doped in subsequent processing to form doped regions 2248-2250.

Figure 27:
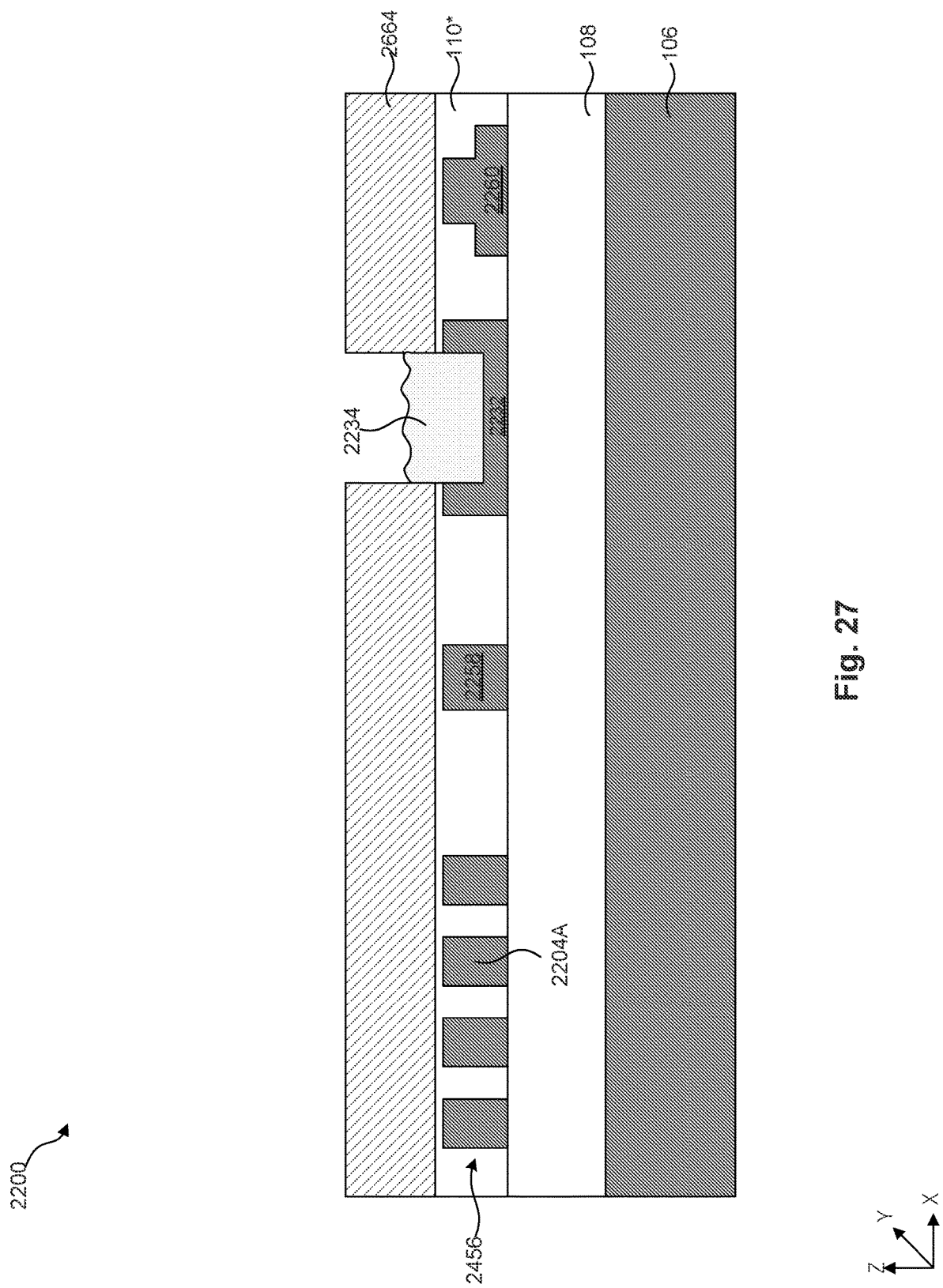
Figure 28:
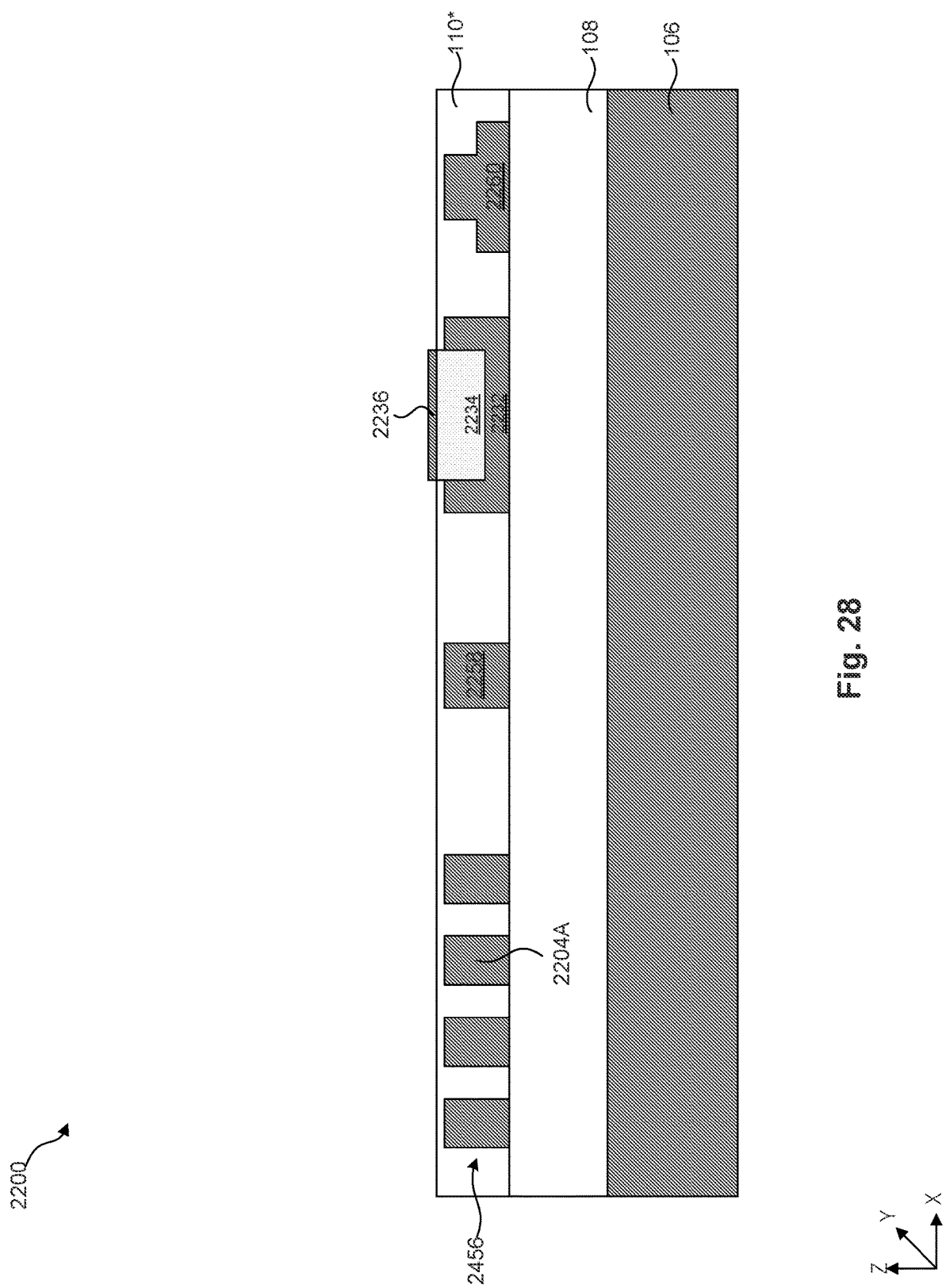
Figure 30:
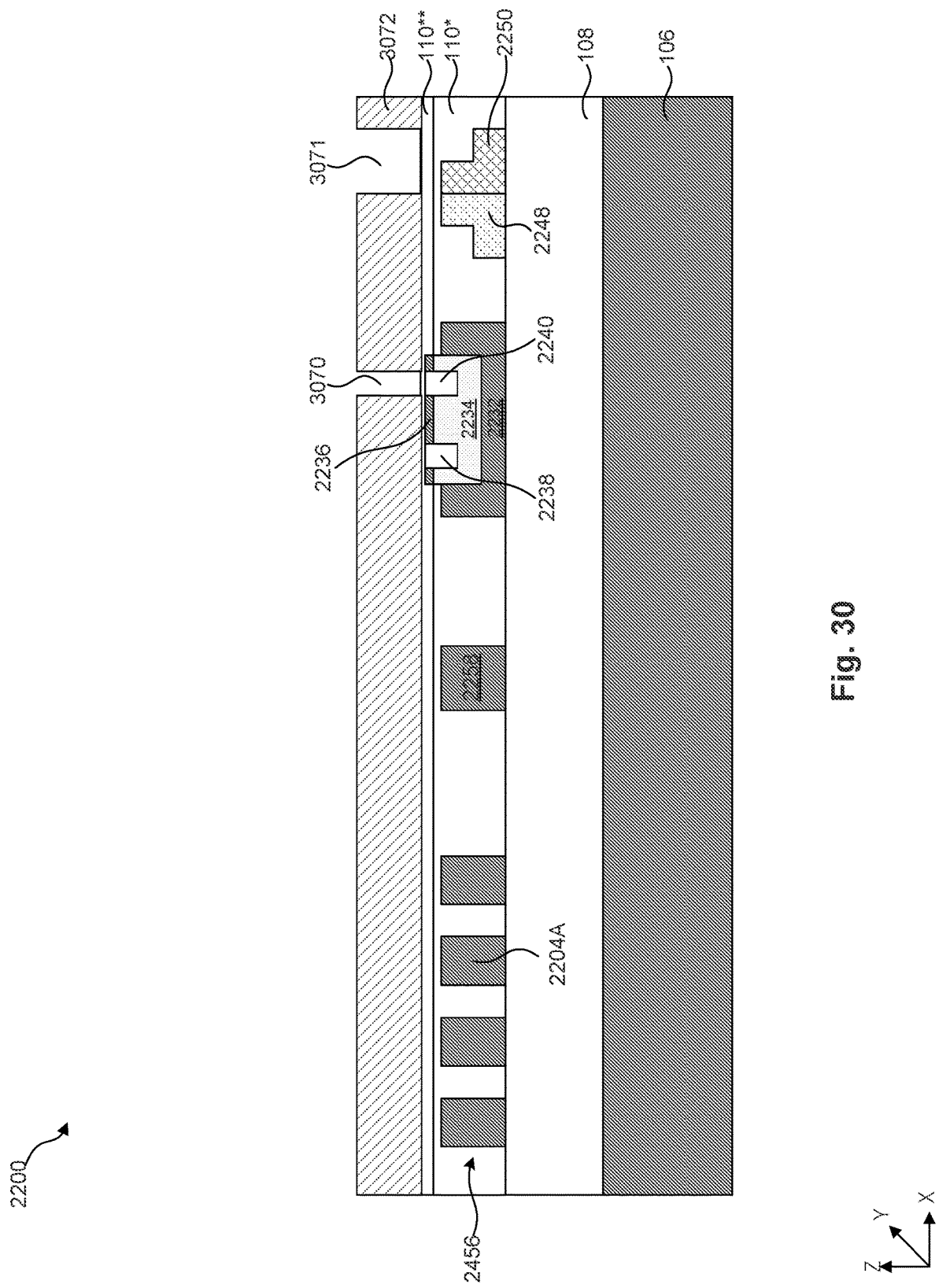
Figure 31:
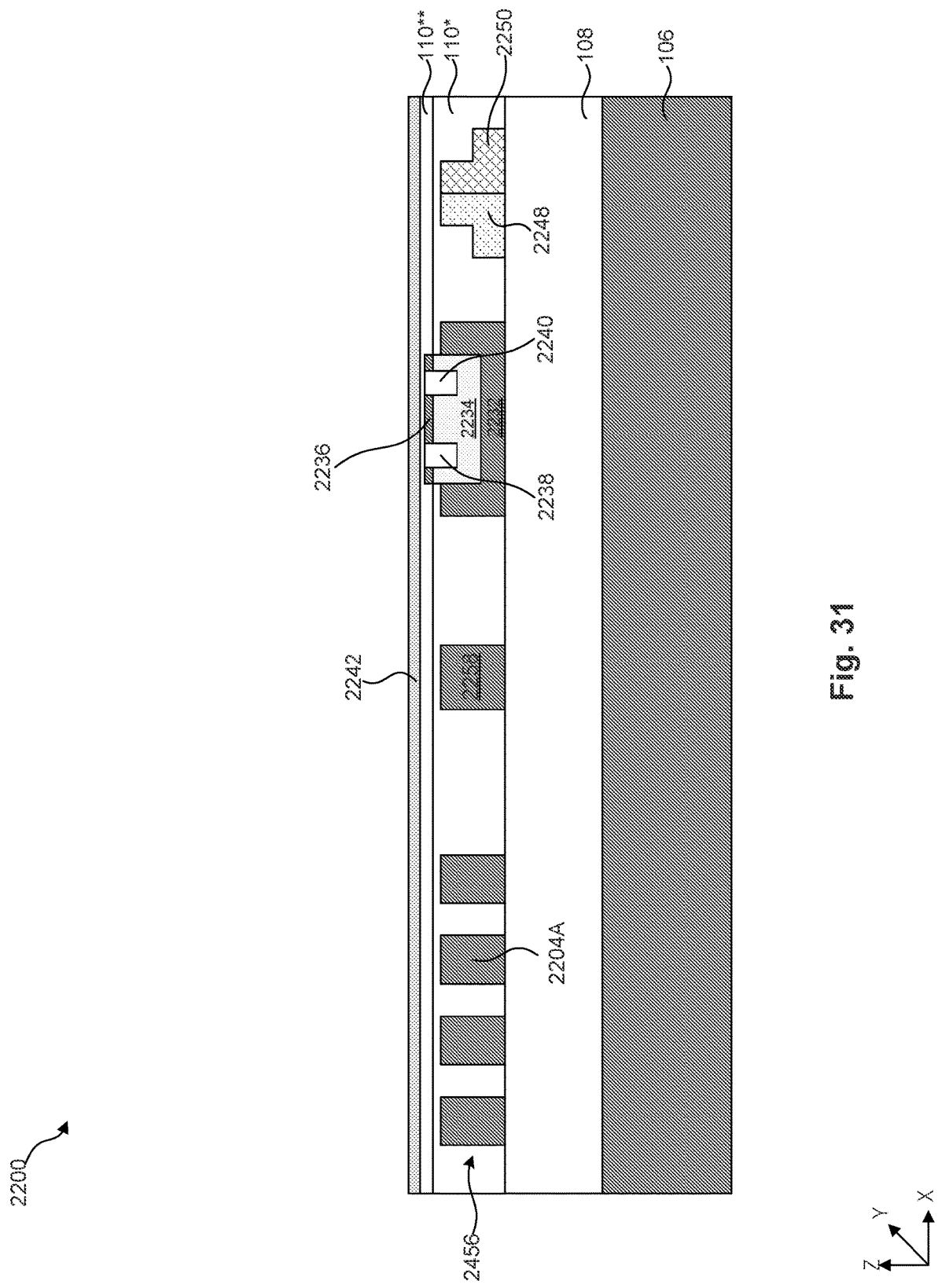

Referring to FIG. 23, in operation 2315, an image sensor is formed on a portion of the patterned semiconductor layer. For example, as described with FIGS. 26-30, image sensor 228 is formed on a portion of patterned semiconductor layer 2456. The formation of image sensor 2228 can include sequential operations of (i) forming a trench 2262 in substrate layer 2232 by selectively etching through an opening in a masking layer 2264 (e.g., a photoresist layer), as shown in FIG. 26, (ii) epitaxially growing Ge layer 2234 in trench 2262, as shown in FIG. 27, (iii) performing a CMP process on Ge layer 2234 to substantially coplanarize top surface of Ge layer 2234 with top surface of oxide layer 110*, as shown in FIG. 28, (iv) selectively depositing capping layer 2236 on Ge layer 2234, as shown in FIG. 28, (v) depositing an oxide layer 110**, similar in material to oxide layer 110*, on the structure of FIG. 28, as shown in FIG. 29, (vi) forming n-type doped region 2238 in Ge layer 2234 and capping layer 2236 by ion implanting n-type dopants through an opening 2966 in a masking layer 2968 (e.g., a photoresist layer), as shown in FIG. 29, (vii) forming p-type doped region 2240 in Ge layer 2234 and capping layer 2236 by ion implanting p-type dopants through an opening 3070 in a masking layer 3072 (e.g., a photoresist layer), as shown in FIG. 30, and (viii) depositing passivation layer 2242 on oxide layer 110**, as shown in FIG. 31.

Figure 29:
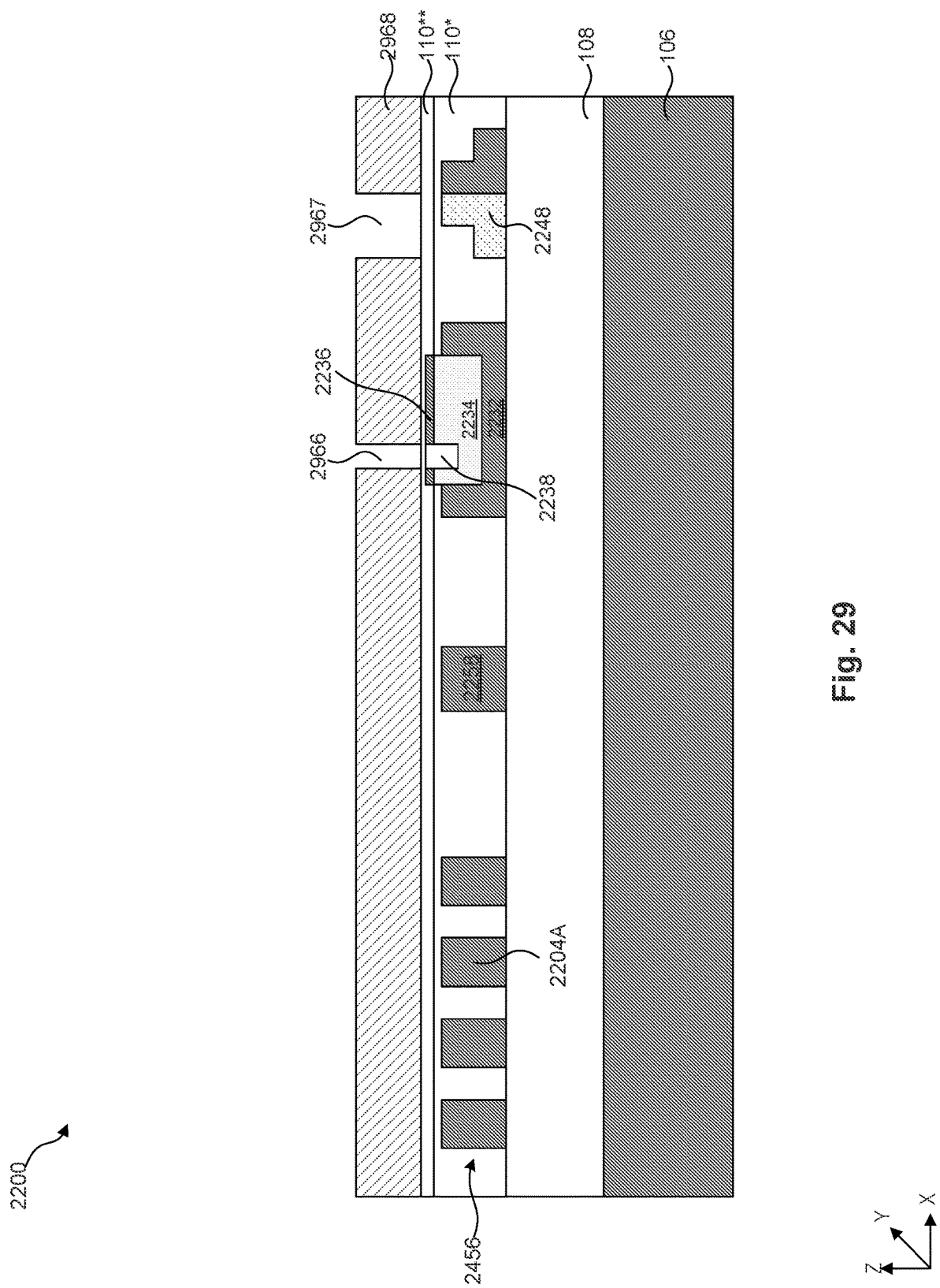

In some embodiments, doped region 2248 can be formed in semiconductor structure 2260 by ion implanting n-type dopants through an opening 2967 in masking layer 2968 during the formation of n-type doped region 2238, as shown in FIG. 29. Similarly, doped region 2250 can be formed in semiconductor structure 2260 by ion implanting p-type dopants through an opening 3071 in masking layer 3072 during the formation of p-type doped region 2240, as shown in FIG. 30.

Figure 32:
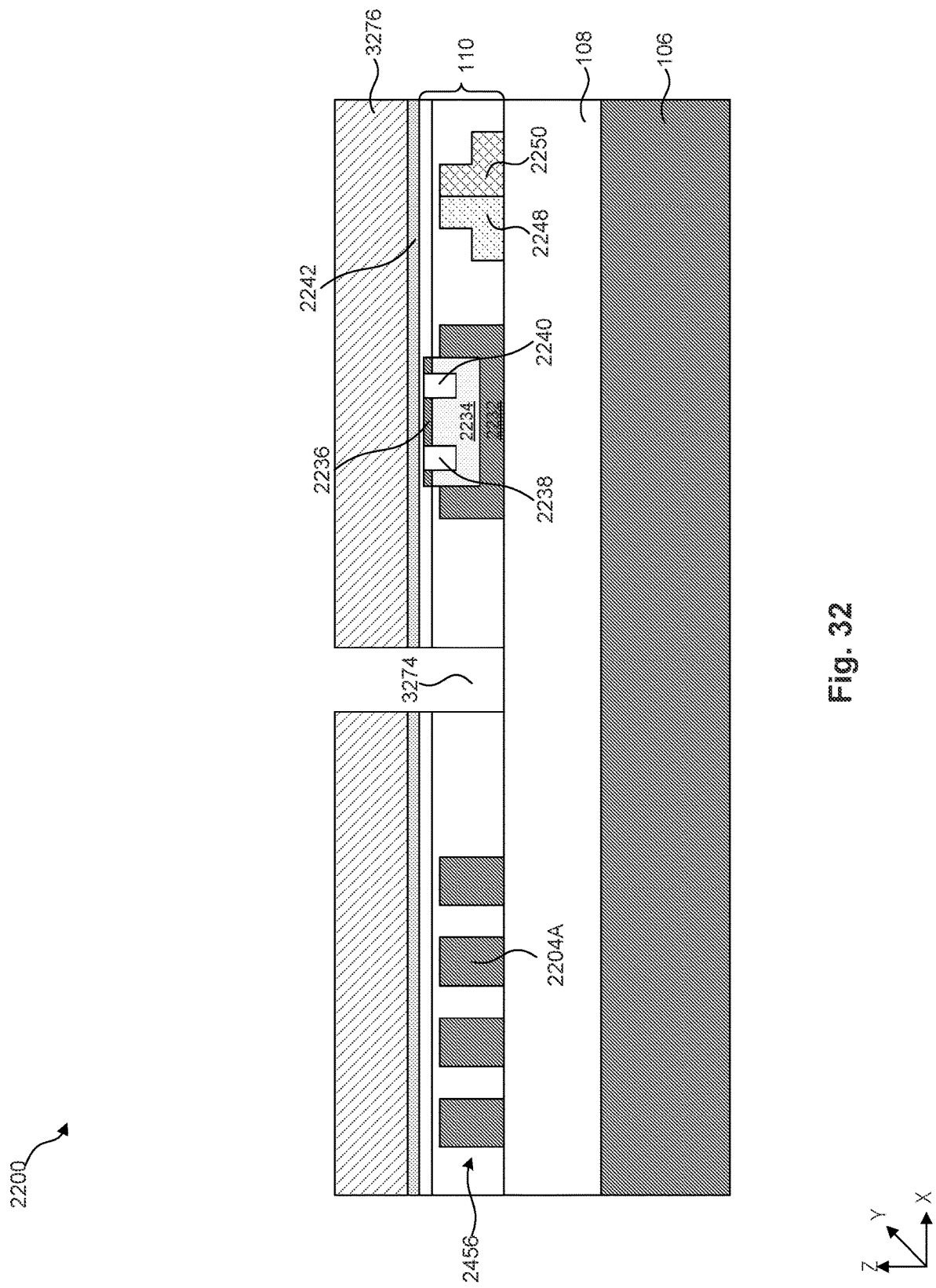
Figure 33:
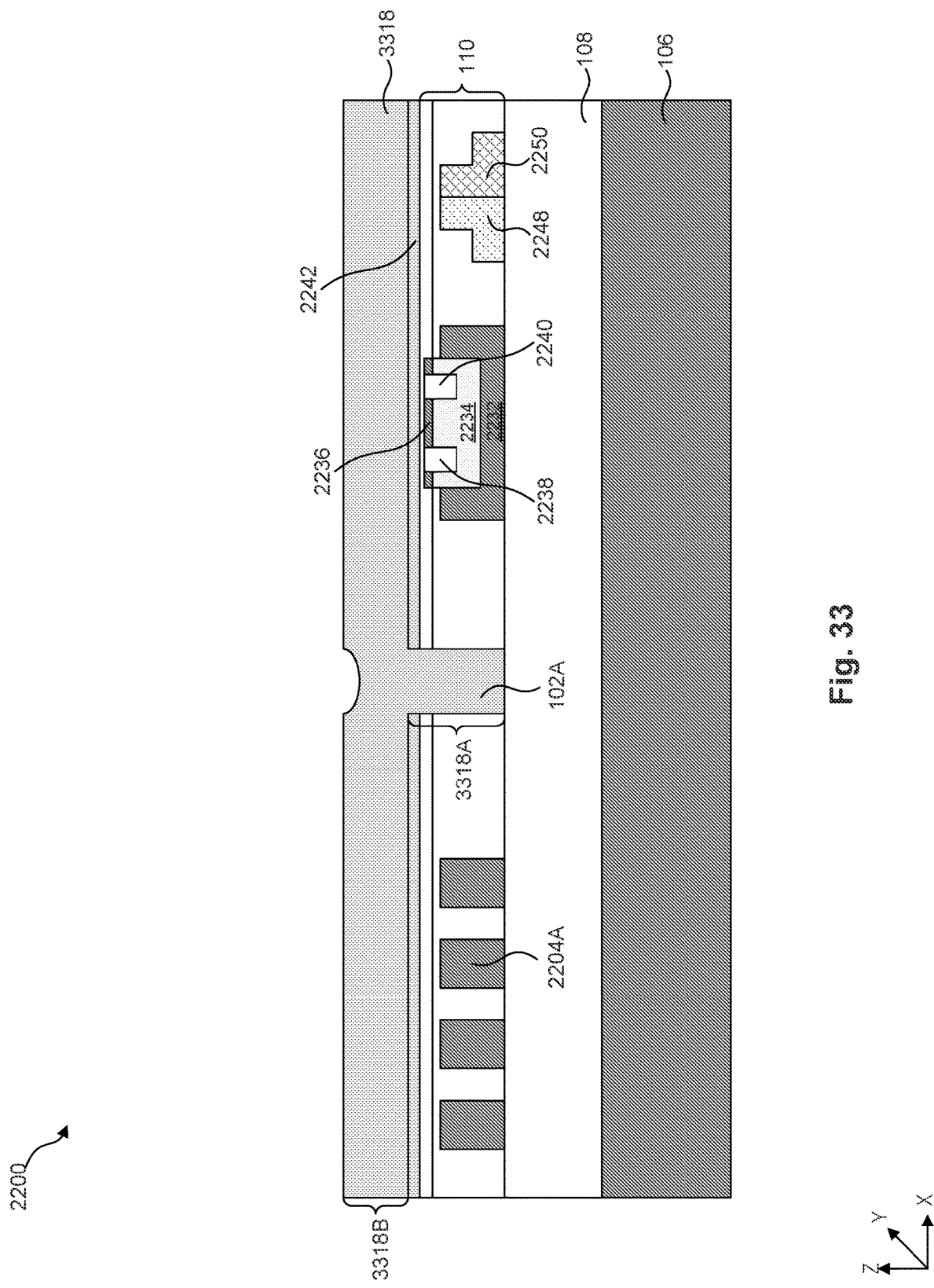
Figure 34:
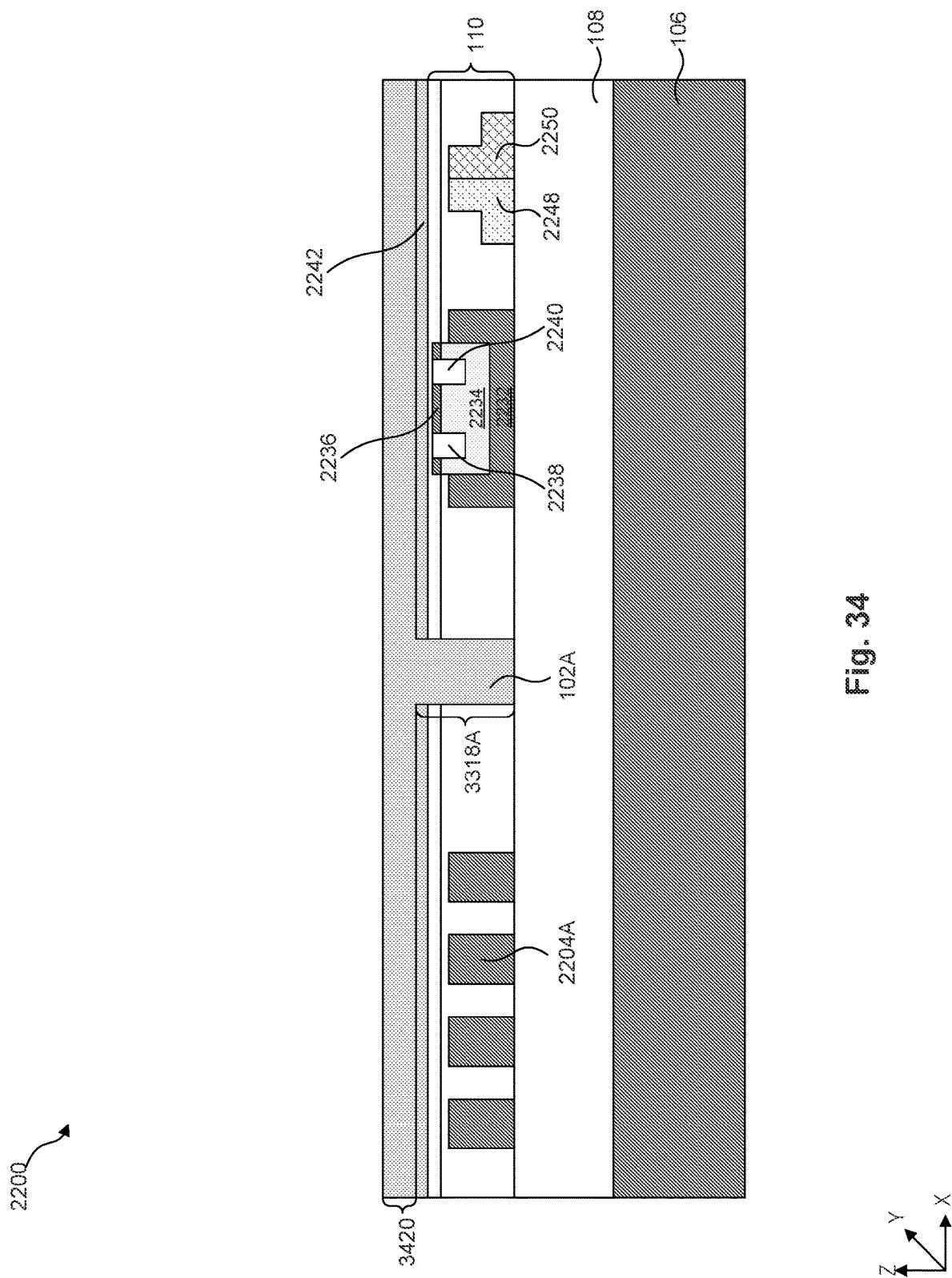
Figure 35:
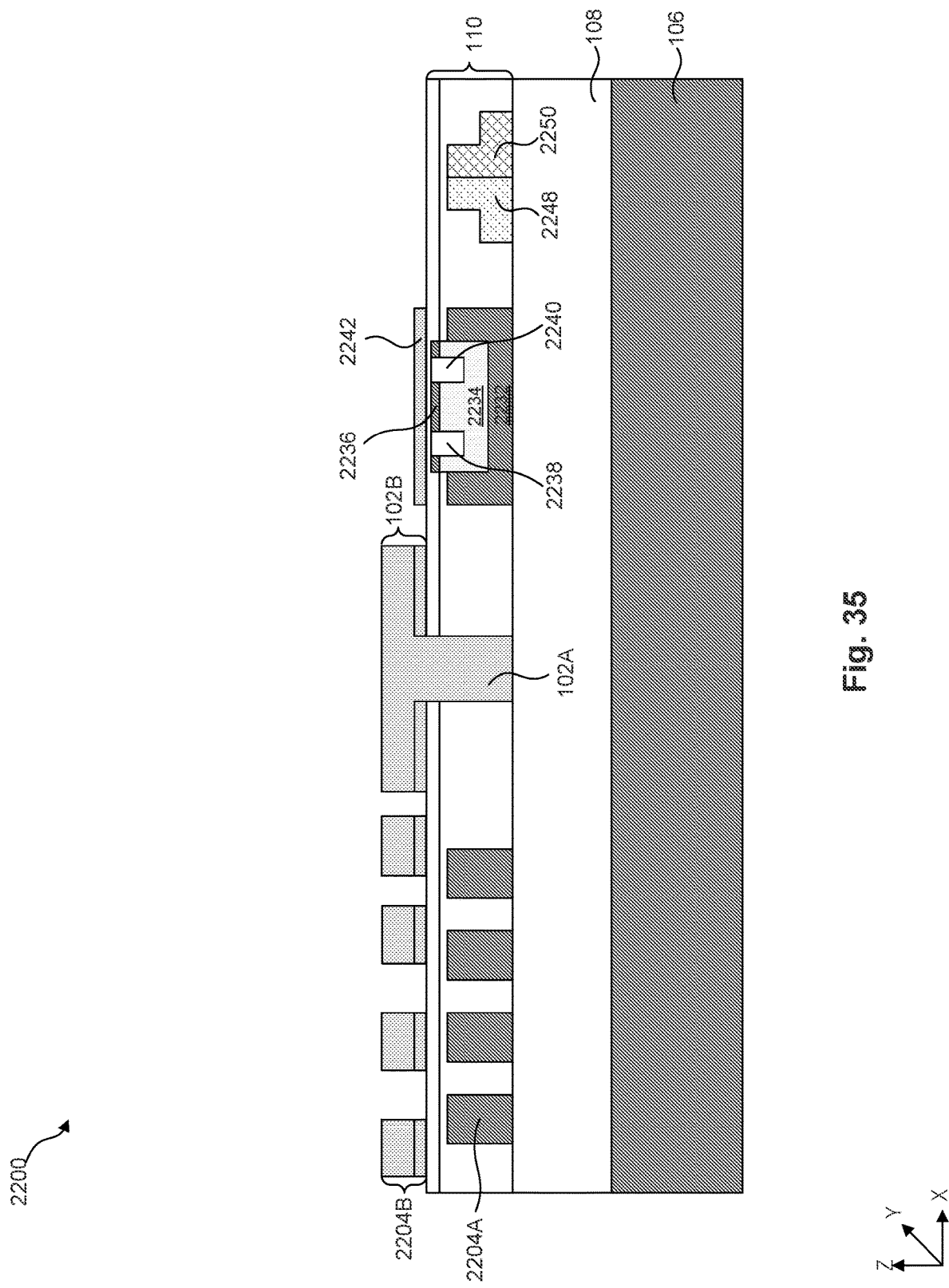

Referring to FIG. 23, in operation 2320, a waveguide and an array of top grating lines of the grating coupler are formed on another portion of the patterned semiconductor layer. For example, as described with FIGS. 31-34, waveguide 102 and array of top grating lines 2204B are formed on another portion of the patterned semiconductor layer 2256. The formation of waveguide 102 can include sequential operations of (i) forming a trench 3274 by selectively etching passivation layer 2236, oxide layers 110*-110**, and sacrificial structure 2258 through an opening in a masking layer 3276 (e.g., a photoresist layer), as shown in FIG. 32, (ii) depositing a high refractive index material layer 3318 on the structure of FIG. 32 after removing masking layer 3276 to form a layer portion 3318A within trench 3274 and a layer portion 3318B extending out of trench 3274, as shown in FIG. 33, (iii) performing a CMP process on layer portion 3318B to form a polished layer 3420, as shown in FIG. 34, and (iv) patterning polished layer 3420 and passivation layer 2236 to form slab portion 102B on patterned template layer 110, as shown in FIG. 35. During the patterning of polished layer 3420 and passivation layer 2236, slab portion 102B can be formed with one portion of polished layer 3420 and passivation layer 2236 and top grating lines 2204B can be formed with another portion of polished layer 3420 and passivation layer 2236, as shown in FIG. 35.

Layer portion 3318A disposed within trench 3274 (FIG. 32) forms rib portion 102A of waveguide 102. As a result, the well-defined sidewall profiles (e.g., substantially linear profiles) of trench 3274 with minimal surface roughness (e.g., less than 1 nm) are transferred to the sidewall profiles of rib portion 102A. The deposition of layer 3318 can include depositing a layer of high refractive index material (e.g., SiN) with a thickness of about 300 nm to about 1000 nm in a low temperature (e.g., temperature at or below about 400° C.) deposition process, such as a PECVD process at a low temperature ranging from about 100° C. to about 400° C., or in other suitable low temperature deposition processes for high refractive index materials. The deposition of high refractive index material layer 3318 is performed in low temperature deposition processes because the structures of image sensor 2228 (e.g., Ge layer 334 or doped regions 2238-2240) and/or isolation device 2230 are susceptible to thermal damages at high temperatures (e.g., temperatures greater than 400° C.).

The CMP process can include polishing layer portion 3318B to form polished layer 3420 with a thickness less than about 300 nm (e.g., about 50 nm, about 100 nm, or about 150 nm). If the thickness of polished layer 3420 is greater than about 300 nm, the subsequent patterning process can require complex processes due to the challenges of patterning high refractive index material with a thickness greater than 200 nm, as discussed above. The patterning of polished layer 3420 and passivation layer 2236 can include using a lithography process and dry or wet etch processes. In some embodiments, the dry etch process can include using etchants having a fluorine-containing gas (e.g., HF, $F_2$). In some embodiments, the wet etch process can include etching in phosphoric acid ($H_3PO_4$).

Figure 36:
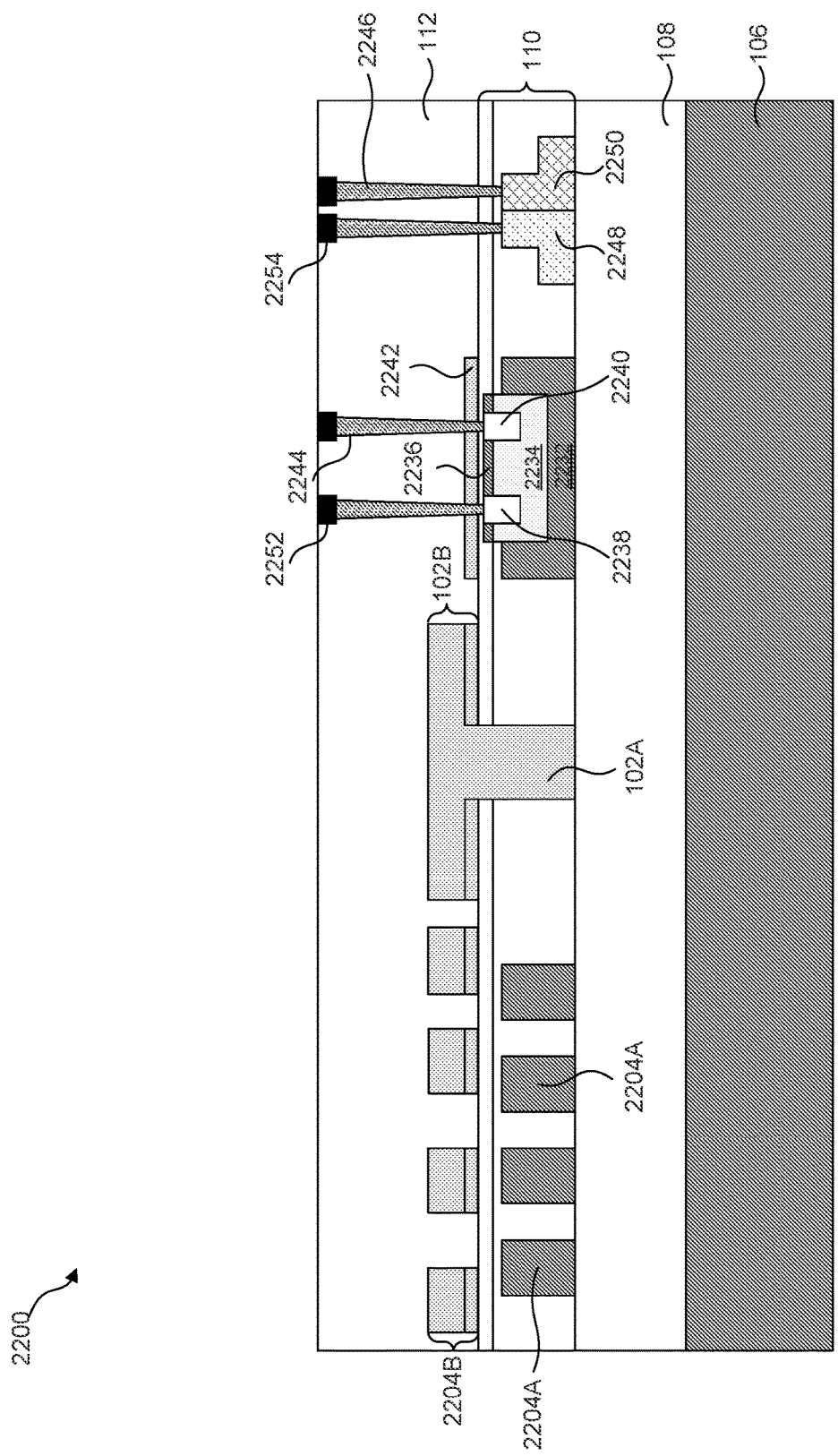

Referring to FIG. 23, in operation 2325, a cladding layer is formed on the waveguide, grating coupler, and image sensor. For example, as shown in FIG. 35, cladding layer 112 is formed on the structure of FIG. 35, as shown in FIG. 36 in an operation similar to operation 220 described with reference to FIG. 8.

Referring to FIG. 23, in operation 2330, contact structures and via structures are formed within the cladding layer. For example, as shown in FIG. 36, contact structures 2244-2246 and via structures 2252-2254 are formed within cladding layer 112. In some embodiments, contact structures 2244-2246 can be formed at the same time and via structures 2252-2254 can be formed on contact structures 2244-2246 at the same time. Contact structures 2244-2246 and via structures 2252-2254 can include metallic materials.

Figure 37:
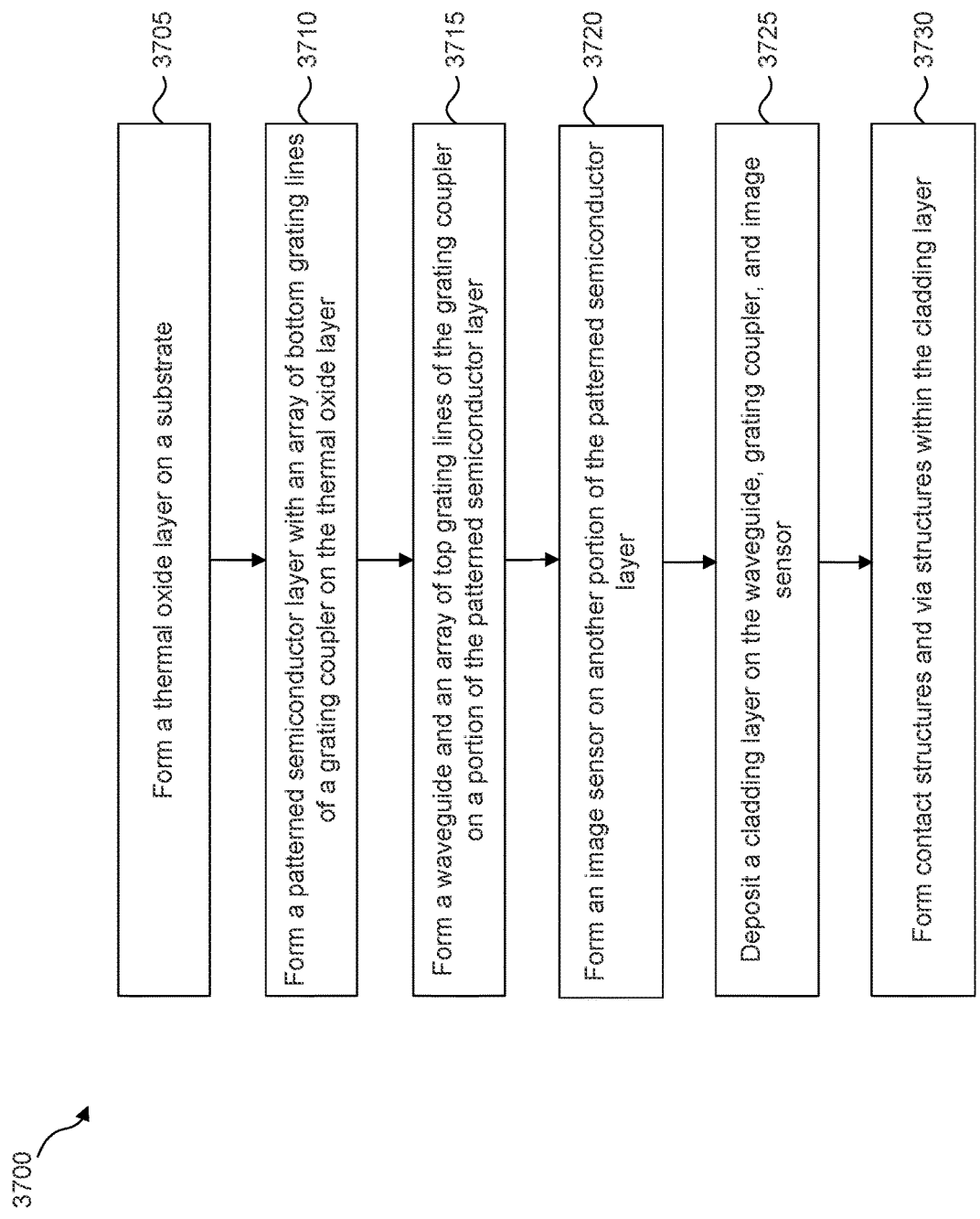
FIG. 37 is a flow diagram of a method for fabricating an optical device with a waveguide, an optical coupling device, and an image sensor, in accordance with some embodiments.

FIG. 37 is a flow diagram of an example method 3700 for fabricating optical device 2200 with waveguide 102 and grating coupler 2204 that has materials with higher optical quality and lower optical propagation loss than that formed in method 2300, according to some embodiments. In method 2300, due to the low temperature deposition of high refractive index material layer 3318, which subsequently-formed waveguide 102 and top grating lines 2204B, the optical quality of the high refractive index material may not be adequate for the optimal performance of waveguide 102 and grating coupler 2204. To improve the optical quality, high refractive index material layer 3318 can be formed in a high temperature (e.g., temperature above about 400° C.) deposition process. However, since image sensor 2228 and/or isolation device 2230 are susceptible to thermal damages at high temperatures, method 3700 can be used, instead of method 2300, to form optical device 2200 with waveguide 102 and grating coupler 2204 that has materials with higher optical quality. In contrast to method 2300, method 3700 forms image sensor 2228 and isolation device 2230 after the formation of waveguide 102 and top grating lines 2204B to prevent thermal damages to image sensor 2228 and/or isolation.

For illustrative purposes, the operations illustrated in FIG. 37 will be described with reference to the example fabrication process for forming optical device 2200 as illustrated in FIGS. 24-36. The operations can be performed in a different order or not performed depending on specific applications. Method 2300 may not produce a complete optical device 2200. Accordingly, additional processes can be provided before, during, and after method 2300, and that some other processes may only be briefly described herein. Elements in FIGS. 24-36 with the same annotations as elements in FIGS. 1A-1D, 3-8, 10-17, 22, and 24-36 are described above.

Figure 38:
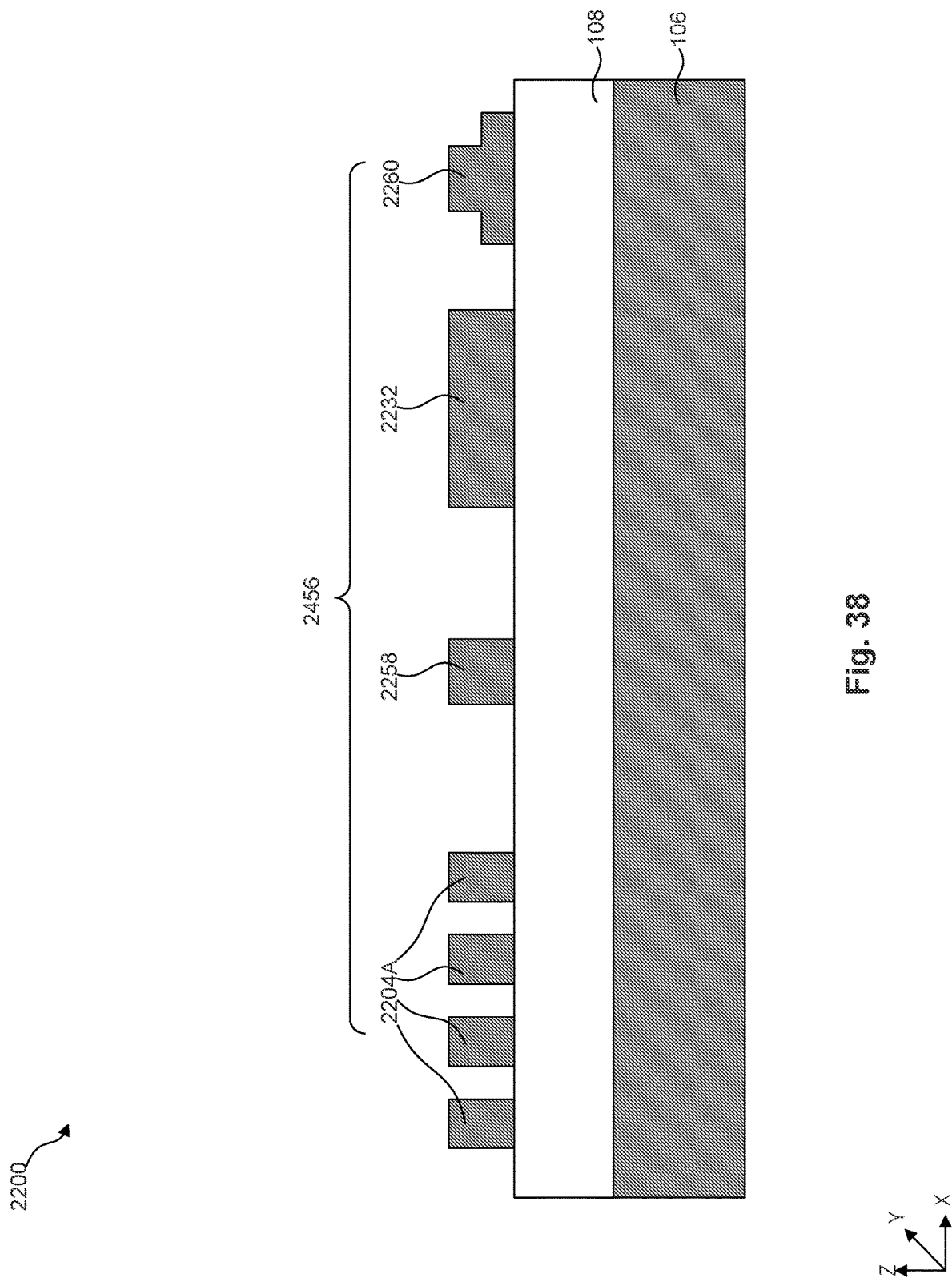
FIGS. 38-44 illustrate cross-sectional views of an optical device with a waveguide, an optical coupling device, and an image sensor at various stages of its fabrication process, in accordance with some embodiments.

In operation 3705, a thermal oxide layer is formed on a substrate. For example, as shown in FIG. 38, thermal oxide layer 108 is formed on substrate 106 in an operation similar to operation 205 described with reference to FIG. 3.

Referring to FIG. 37, in operation 3710, a patterned semiconductor layer with an array of bottom grating lines of a grating coupler is formed on the thermal oxide layer. For example, as shown in FIG. 38, a patterned semiconductor layer 2456 with array of bottom grating lines 2204A is formed on thermal oxide layer 108 in an operation similar to operation 2310 described with reference to FIGS. 24-25.

Figure 39:
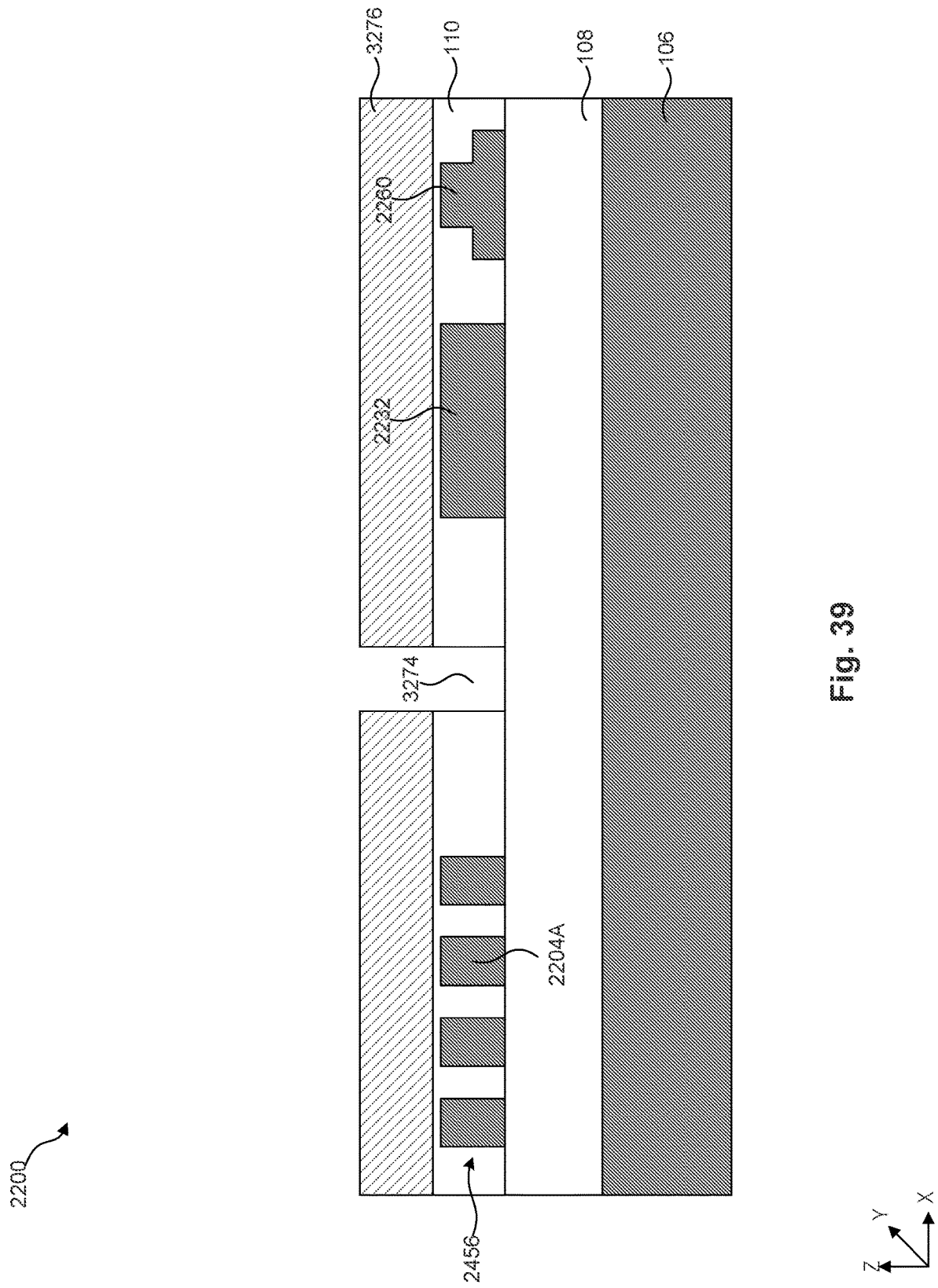
Figure 40:
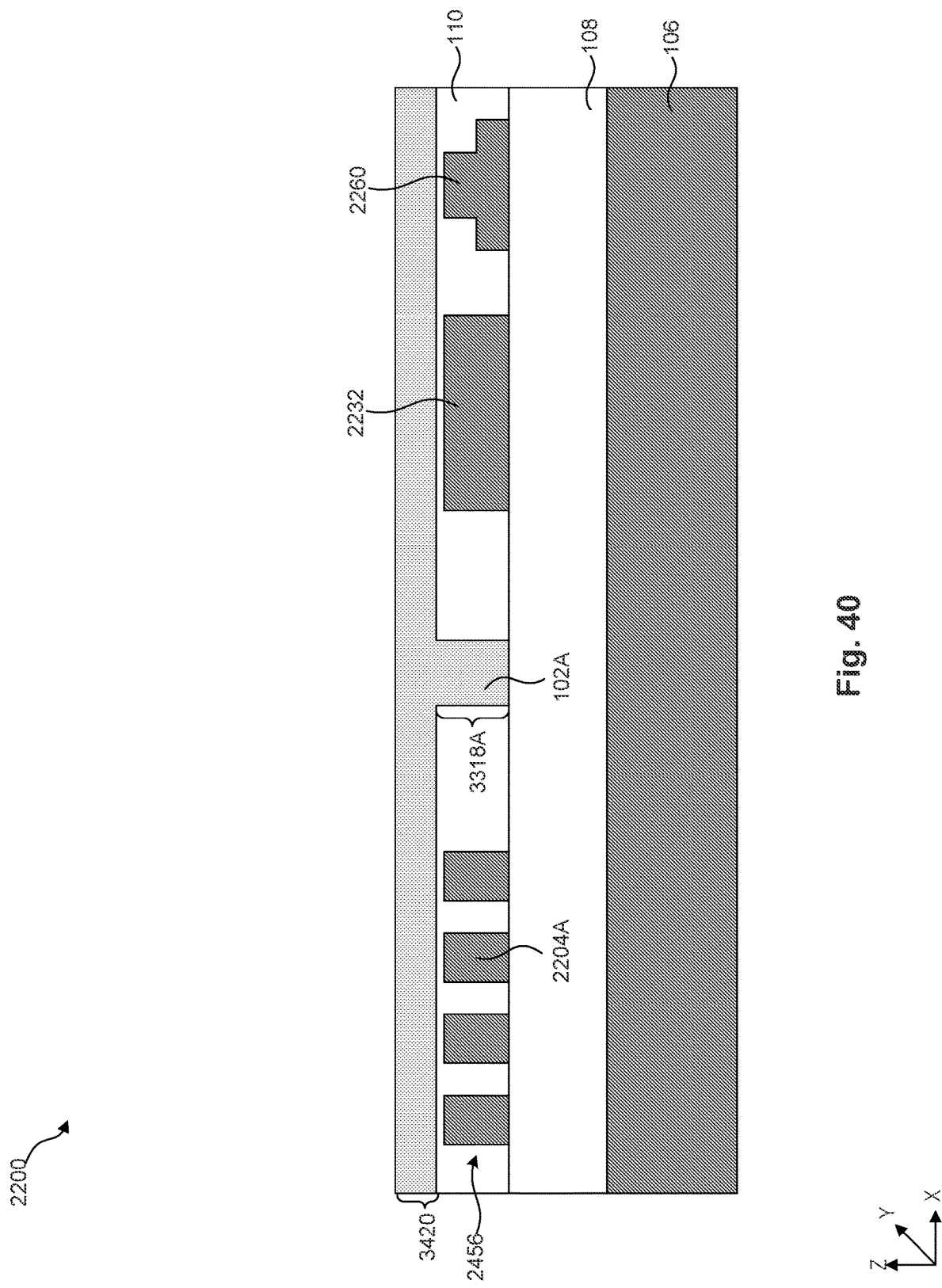
Figure 41:
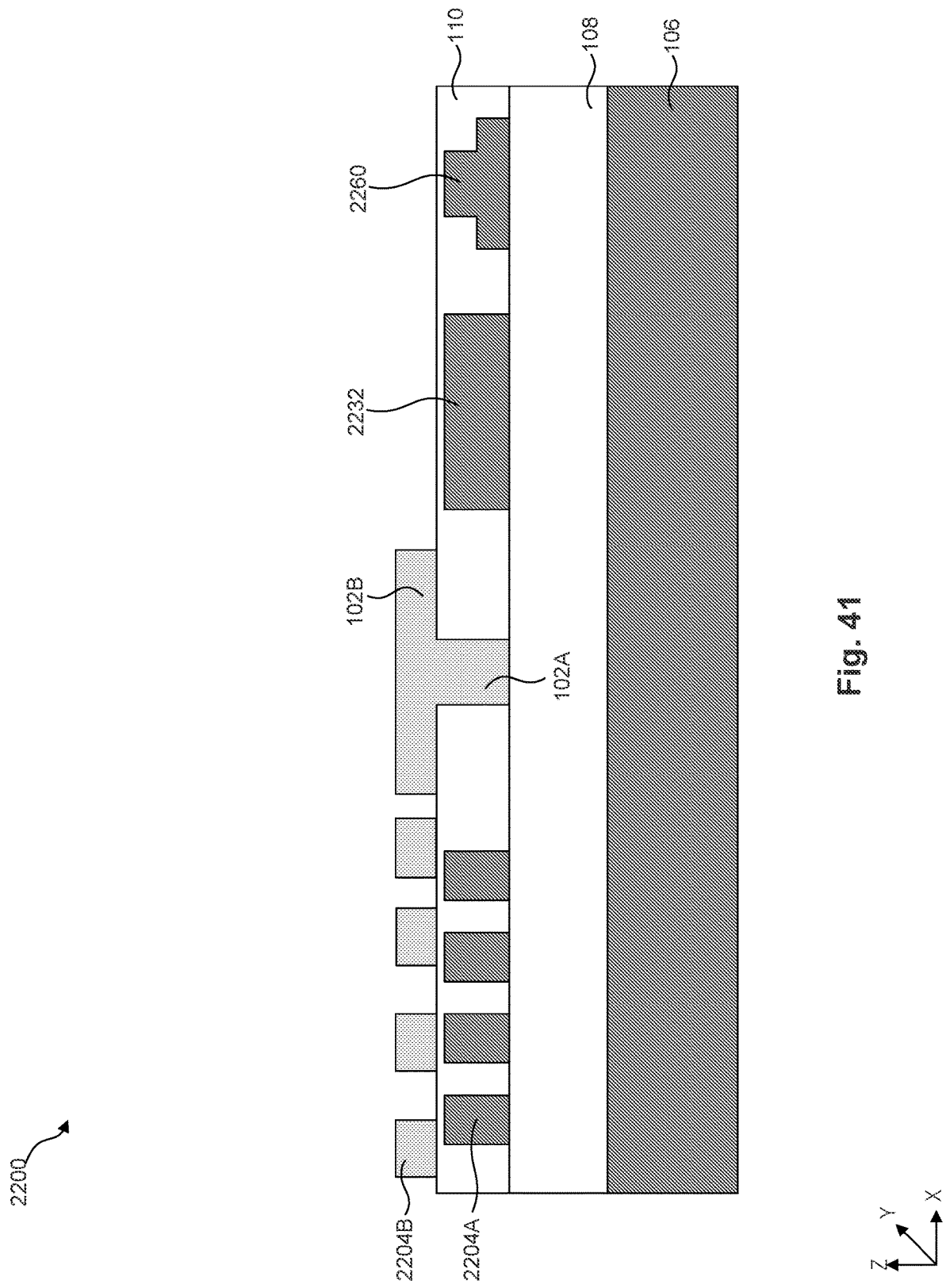
Figure 42:
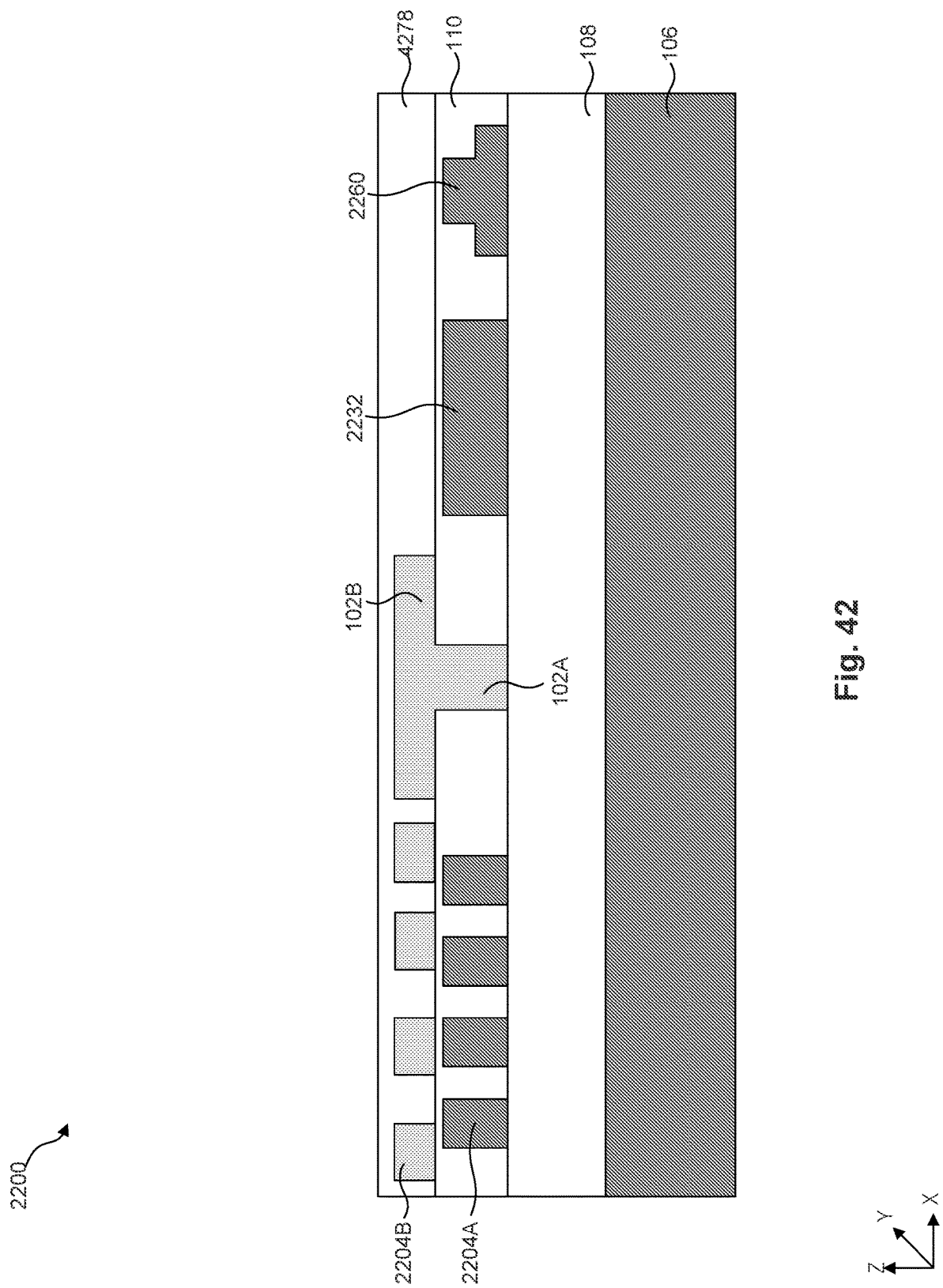

Referring to FIG. 37, in operation 3715, a waveguide and an array of top grating lines of the grating coupler are formed on a portion of the patterned semiconductor layer. For example, as described with FIGS. 39-41, waveguide 102 and array of top grating lines 2204B are formed on a portion of the patterned semiconductor layer 2256. The formation of waveguide 102 can include sequential operations of (i) forming trench 3274 by selectively etching oxide layer 110* and sacrificial structure 2258 through an opening in masking layer, as shown in FIG. 39, (ii) depositing high refractive index material layer 3318 in a high temperature deposition process, such as a LPCVD process at a high temperature ranging from about 700° C. to about 900° C., or in other suitable high temperature deposition processes for high refractive index materials, (iii) performing CMP process in an operation similar to operation 2320 described with reference to FIG. 34 to form a polished layer 3420, as shown in FIG. 40, and (iv) patterning polished layer 3420 in an operation similar to operation 2320 described with reference to FIG. 35 to form slab portion 102B, as shown in FIG. 41. During the patterning of polished layer 3420, slab portion 102B can be formed with one portion of polished layer 3420 and top grating lines 2204B can be formed with another portion of polished layer 3420, as shown in FIG. 41. In some embodiments, as shown in FIG. 41, a dielectric layer 4278 can be deposited on the structure of FIG. 40 to protect waveguide 102 and top grating lines 2204B from subsequent processing. Dielectric layer 4278 can include a material similar to oxide layer 110 and/or cladding layer 112.

Figure 43:
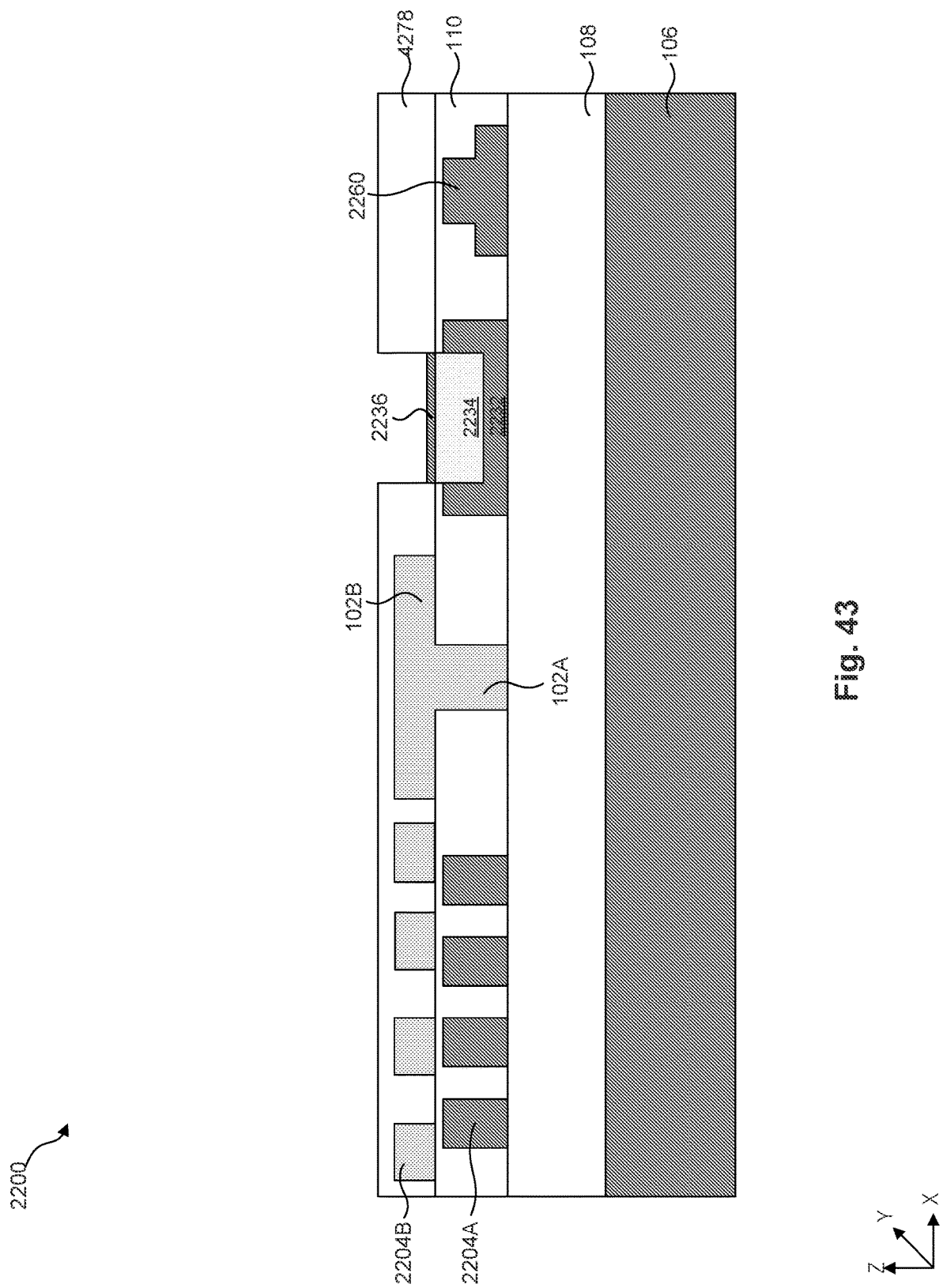
Figure 44:
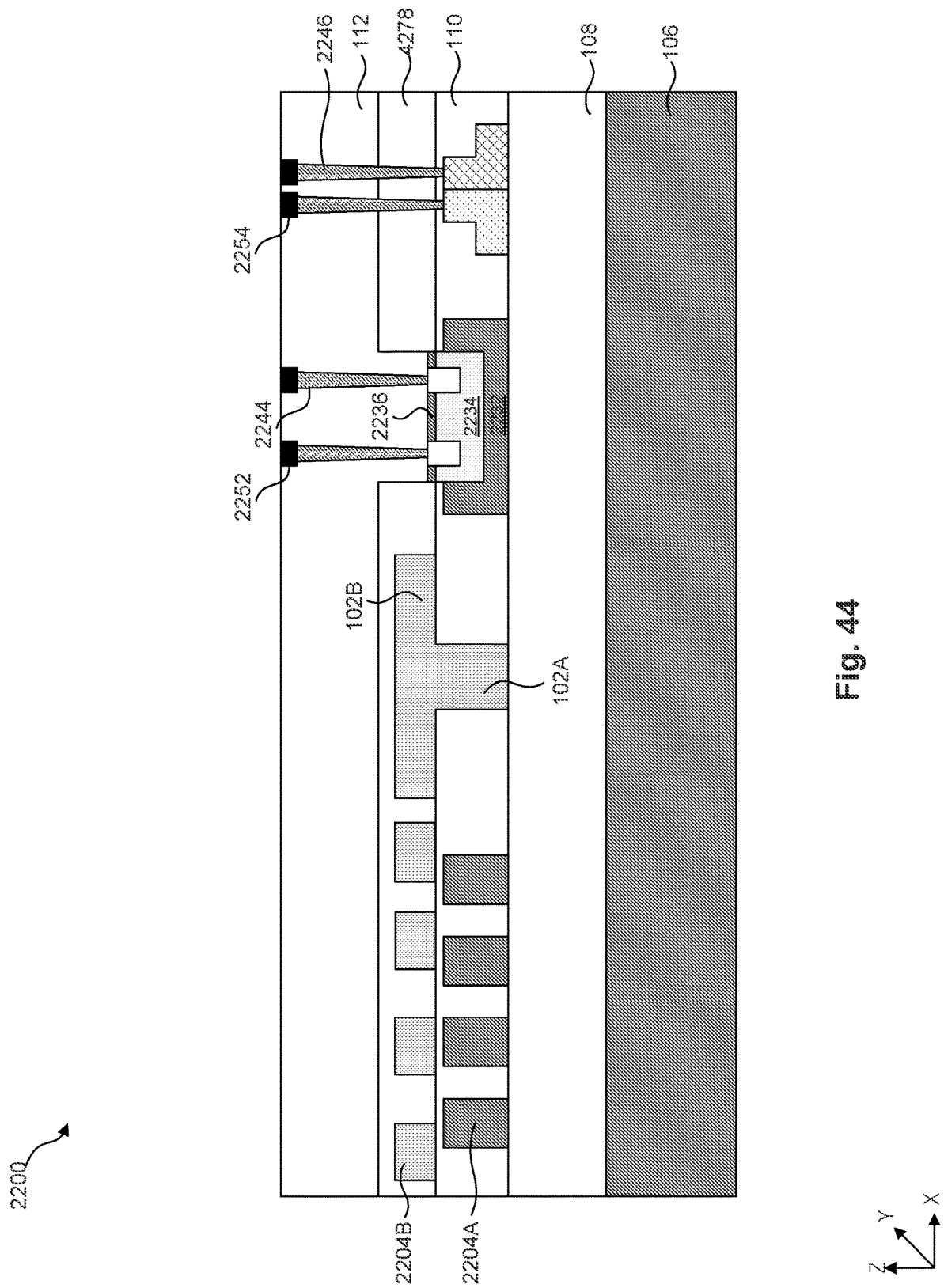

Referring to FIG. 37, in operation 3720, an image sensor is formed on another portion of the patterned semiconductor layer. For example, as described with FIGS. 43-44, image sensor 228 is formed on another portion of patterned semiconductor layer 2456. The formation of image sensor 2228 can include sequential operations of (i) forming Ge layer 2234 and capping layer 2236, as shown in FIG. 43, in an operation similar to operation 2315 described with reference to FIGS. 26-28, and (ii) forming doped regions 2238-2240, as shown in FIG. 44, in an operation similar to operation 2315 described with reference to FIGS. 29-30. In some embodiments, doped regions 2248-2250, as shown in FIG. 44, can be formed in an operation similar to operation 2315 described with reference to FIGS. 29-30.

Referring to FIG. 37, in operation 3725, a cladding layer is formed on the waveguide, grating coupler, and image sensor. For example, as shown in FIG. 44, cladding layer 112 is formed on the structure of FIG. 43, as shown in FIG. 44 in an operation similar to operation 2325 described with reference to FIG. 36.

Referring to FIG. 37, in operation 3730, contact structures and via structures are formed within the cladding layer. For example, as shown in FIG. 44, contact structures 2244-2246 and via structures 2252-2254 are formed within cladding layer 112 in an operation similar to operation 2330 described with reference to FIG. 36.

The present disclosure provides examples methods (e.g., methods 200, 900, 1800, 2300, and 3700) of fabricating waveguides (e.g., waveguide 102) and couplers (e.g., grating couplers 104 and 2204) with improved process control in patterning high refractive index materials. In some embodiments, the example methods use a patterned layer of a relatively lower refractive index material (e.g., Si or $SiO_2$) as a template to pattern thick layers of the high refractive index materials. The low refractive index material used for the patterned template layer (e.g., patterned template layer 110) has a less complex patterning process and a better critical dimension control of the patterned features than high refractive index materials. The use of the patterned template layer with the low refractive index materials eliminates the complex deposition, etching, and polishing processes required for patterning thick layers of high refractive index materials. As a result, the use of the patterned template layer mitigates the stress related damages to the substrate of the waveguides and couplers and reduces the complexities of fabricating waveguides and couplers with thick layers of the high refractive index materials.

Further, the use of the patterned template layer provides better control over the edge roughness, surface roughness, and/or line width uniformity of the features patterned with the high refractive index materials. The smoother surfaces lead to low optical losses in the waveguides and couplers. In some embodiments, the example methods can reduce the surface roughness to about 1 nm or less, which leads to propagation loss in Si-based waveguides to be about 1 dB/cm or less and in SiN-based waveguides to about 0.2 dB/cm or less.

In some embodiments, a method includes forming a first oxide layer on a substrate and forming a patterned template layer with first and second trenches on the first oxide layer. A material of the patterned template layer has a first refractive index. The method further includes forming a first portion of a waveguide and a first portion of an optical coupler within the first and second trenches, respectively, forming a second portion of the waveguide and a second portion of the optical coupler on a top surface of the patterned template layer, and depositing a cladding layer on the second portions of the waveguide and optical coupler. The waveguide and the optical coupler include materials with a second refractive index that is greater than the first refractive index.

In some embodiments, a method includes forming a thermal oxide layer on a substrate and forming a patterned semiconductor layer on the thermal oxide layer. A first portion of the patterned semiconductor layer forms a bottom grating line of a coupler, a second portion of the patterned semiconductor layer forms a sacrificial layer, and a third portion of the patterned semiconductor layer forms a substrate layer. The method further includes forming an image sensor on the substrate layer, forming a patterned template layer with a trench on the thermal oxide layer, forming a rib portion of a waveguide within the trench, wherein the image sensor is adjacent to the waveguide, forming a slab portion of the waveguide and a top grating line of the coupler on a top surface of the patterned template layer, and depositing a cladding layer on the slab portion, the top grating line, and the image sensor.

In some embodiments, an optical device includes a substrate, a thermal oxide layer disposed on the substrate, a non-thermal oxide layer disposed on the thermal oxide layer, and a waveguide disposed on the thermal oxide layer. The waveguide includes a rib portion and tapered portion disposed within the non-thermal oxide layer and a slab portion disposed on the rib portion and the tapered portion. The optical device further includes a grating coupler disposed on the thermal oxide layer and a cladding layer disposed on the waveguide and grating coupler. The grating coupler includes a bottom grating line disposed within the non-thermal oxide layer and a top grating line disposed on a top surface of the non-thermal oxide layer. The top and bottom grating lines are non-overlapping with respect to each other.

The foregoing disclosure outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    forming an unpatterned thermal oxide layer on a substrate;
    depositing a non-thermal oxide layer comprising a first refractive index on the unpatterned thermal oxide layer;
    patterning the non-thermal oxide layer to form a trench on the unpatterned thermal oxide layer;

forming a first portion of a waveguide, in the trench, with a material comprising a second refractive index that is greater than the first refractive index;
forming a second portion of the waveguide on a top surface of the non-thermal oxide layer; and
depositing a cladding layer on the second portion of the waveguide.

2. The method of claim 1, further comprising forming a portion of an optical coupler, in the non-thermal oxide layer, with a material comprising the second refractive index.

3. The method of claim 1, further comprising forming a portion of an optical coupler, on the non-thermal oxide layer, with a material comprising the second refractive index.

4. The method of claim 1, wherein depositing the non-thermal oxide layer comprises depositing an oxide layer with a chemical vapor deposition process.

5. The method of claim 1, wherein forming the first portion of the waveguide comprises depositing a dielectric layer comprising the second refractive index in the trench.

6. The method of claim 1, wherein forming the second portion of the waveguide comprises:
depositing a dielectric layer in the trench and on a top surface of the non-thermal oxide layer; and
patterning a portion of the dielectric layer that is disposed on the top surface of the non-thermal oxide layer.

7. The method of claim 1, wherein forming the second portion of the waveguide comprises:
depositing a dielectric layer with the second refractive index on the non-thermal oxide layer;
polishing a portion of the dielectric layer that is disposed on a top surface of the non-thermal oxide layer to form a polished layer; and
patterning the polished layer.

8. The method of claim 1, further comprising forming a polish stop layer on the non-thermal oxide layer prior to patterning the non-thermal oxide layer to form the trench.

9. The method of claim 8, further comprising removing the polish stop layer after forming the second portion of the waveguide.

10. The method of claim 1, further comprising depositing an etch stop layer on the unpatterned thermal oxide layer prior to depositing the non-thermal oxide layer.

11. A method, comprising:
forming an oxide layer on a substrate;
depositing a semiconductor layer on the oxide layer;
forming a bottom grating line of an optical coupler in a first portion of the semiconductor layer;
forming an image sensor in a second portion of the semiconductor layer;
forming a waveguide in a third portion of the semiconductor layer;
forming a top grating line of the optical coupler on the bottom grating line of the optical coupler; and
depositing a cladding layer on the waveguide, the optical coupler, and the image sensor.

12. The method of claim 11, wherein forming the bottom grating line comprises patterning the semiconductor layer.

13. The method of claim 11, wherein forming the waveguide comprises:
patterning the third portion of the semiconductor layer to form a sacrificial layer;
depositing an other oxide layer on the sacrificial layer;
removing the sacrificial layer to form a trench in the other oxide layer; and
depositing a dielectric layer in the trench and on the other oxide layer.

14. The method of claim 11, wherein forming the waveguide comprises:
depositing an other oxide layer on the semiconductor layer;
forming a trench through the other oxide layer and the third portion of the semiconductor layer; and
depositing a dielectric layer in the trench and on the other oxide layer.

15. The method of claim 11, wherein forming the top grating line comprises:
depositing an other oxide layer on the bottom grating line;
depositing a dielectric layer on the other oxide layer; and
patterning a portion of the dielectric layer that is overlapping with the bottom grating line.

16. The method of claim 11, wherein forming the image sensor is performed after forming the waveguide.

17. An optical device, comprising:
a substrate;
a first dielectric layer disposed on the substrate;
a second dielectric layer disposed on the first dielectric layer;
a waveguide disposed on the first dielectric layer, wherein the waveguide comprises a tapered portion disposed in the second dielectric layer and a slab portion disposed on the tapered portion; and
an optical coupler disposed on the first dielectric layer, wherein the optical coupler comprises a bottom grating line disposed in the second dielectric layer and a top grating line disposed on a top surface of the second dielectric layer and non-overlapping with the bottom grating line.

18. The optical device of claim 17, wherein the first and second dielectric layers are oxide layers.

19. The optical device of claim 17, wherein a material of the waveguide has a refractive index greater than a refractive index of the second dielectric layer.

20. The optical device of claim 17, further comprising a cladding layer surrounding the top grating line.

* * * * *